(12) United States Patent
Moulton

(10) Patent No.: US 7,194,504 B2
(45) Date of Patent: Mar. 20, 2007

(54) SYSTEM AND METHOD FOR REPRESENTING AND MAINTAINING REDUNDANT DATA SETS UTILIZING DNA TRANSMISSION AND TRANSCRIPTION TECHNIQUES

(75) Inventor: Gregory Hagan Moulton, Irvine, CA (US)

(73) Assignee: Avamar Technologies, Inc., Irvine, CA (US)

( * ) Notice: Subject to any disclaimer, the term of this patent is extended or adjusted under 35 U.S.C. 154(b) by 1019 days.

(21) Appl. No.: 09/781,920

(22) Filed: Feb. 12, 2001

(65) Prior Publication Data

US 2002/0010797 A1   Jan. 24, 2002

Related U.S. Application Data

(60) Provisional application No. 60/183,762, filed on Feb. 18, 2000.

(51) Int. Cl.
*G06F 17/00* (2006.01)

(52) U.S. Cl. .................. 709/203; 380/217; 382/244

(58) Field of Classification Search ........ 709/200–203; 382/244, 232; 380/217
See application file for complete search history.

(56) References Cited

U.S. PATENT DOCUMENTS

| | | | | |
|---|---|---|---|---|
| 3,668,647 A | 6/1972 | Evangelisti et al. | ..... | 340/172.5 |
| 4,215,402 A | 7/1980 | Mitchell et al. | ............ | 364/200 |
| 4,649,479 A | 3/1987 | Advani et al. | .............. | 364/300 |
| 4,761,785 A | 8/1988 | Clark et al. | ................... | 371/51 |
| 4,887,204 A | 12/1989 | Johnson et al. | ............ | 364/200 |
| 4,887,235 A | 12/1989 | Holloway et al. | .......... | 364/900 |
| 4,897,781 A | 1/1990 | Chang et al. | ............... | 364/200 |
| 4,901,223 A | 2/1990 | Rhyne | ........................ | 364/200 |
| 4,982,324 A | 1/1991 | McConaughy et al. | ..... | 364/200 |
| 5,005,122 A | 4/1991 | Griffin et al. | ............... | 364/200 |
| 5,018,060 A | 5/1991 | Gelb et al. | ................... | 364/200 |
| 5,089,958 A | 2/1992 | Horton et al. | .............. | 395/575 |
| 5,109,515 A | 4/1992 | Laggis et al. | ............... | 395/725 |
| 5,133,065 A | 7/1992 | Cheffetz et al. | ............ | 395/575 |
| 5,146,568 A | 9/1992 | Flaherty et al. | ............. | 395/325 |
| 5,155,835 A | 10/1992 | Belsan | ....................... | 395/425 |
| 5,162,986 A | 11/1992 | Graber et al. | ............... | 364/146 |
| 5,163,148 A | 11/1992 | Walls | ......................... | 395/600 |
| 5,210,866 A | 5/1993 | Milligan et al. | ............ | 395/575 |

(Continued)

OTHER PUBLICATIONS http://www.w3.org/TR/NOTE-gdiff-19970901.*

(Continued)

*Primary Examiner*—David Jung
(74) *Attorney, Agent, or Firm*—William J. Kubida; Kent A. Lembke; Hogan & Hartson LLP

(57) ABSTRACT

A system and method for representing and maintaining redundant data sets utilizing system DNA transmission and transcription techniques comprising a system of symbolic exchange used for data transmission whose lexicon is based on the provision of unique and consistent identifiers (or symbols) for transmitted data utilizing "sticky byte" factoring. A protocol is provided for determining which entries (comprising unique identifier to corresponding data pairs) in a local lexicon (or "Primordial Data Pool") are contained in a remote lexicon and can, therefore, be used in a transmission in lieu of the data itself. A mechanism is further provided through which the local lexicon can add newly presented unique identifier to corresponding data pairs to one or more remote lexicons.

49 Claims, 18 Drawing Sheets

U.S. PATENT DOCUMENTS

| | | | | |
|---|---|---|---|---|
| 5,218,695 | A | 6/1993 | Noveck et al. | 395/600 |
| 5,239,637 | A | 8/1993 | Davis et al. | 395/425 |
| 5,239,647 | A | 8/1993 | Anglin et al. | 395/600 |
| 5,239,659 | A | 8/1993 | Rudeseal et al. | 395/800 |
| 5,263,154 | A | 11/1993 | Eastridge et al. | 395/575 |
| 5,276,860 | A | 1/1994 | Fortier et al. | 395/575 |
| 5,276,867 | A | 1/1994 | Kenley et al. | 395/600 |
| 5,278,838 | A | 1/1994 | Ng et al. | 371/10.1 |
| 5,305,389 | A | 4/1994 | Palmer | 382/1 |
| 5,317,728 | A | 5/1994 | Tevis et al. | 395/600 |
| 5,325,505 | A | 6/1994 | Hoffecker et al. | 395/425 |
| 5,347,653 | A | 9/1994 | Flynn et al. | 395/600 |
| 5,355,453 | A | 10/1994 | Row et al. | 395/200 |
| 5,367,637 | A | 11/1994 | Wei | 395/250 |
| 5,367,698 | A | 11/1994 | Webber et al. | 395/800 |
| 5,379,418 | A | 1/1995 | Shimazaki et al. | 395/575 |
| 5,403,639 | A | 4/1995 | Belsan et al. | 395/600 |
| 5,404,508 | A | 4/1995 | Konrad et al. | 395/600 |
| 5,404,527 | A | 4/1995 | Irwin et al. | 395/700 |
| 5,448,718 | A | 9/1995 | Cohn et al. | 395/404 |
| 5,452,440 | A | 9/1995 | Salsburg | 395/463 |
| 5,452,454 | A | 9/1995 | Basu | 395/700 |
| 5,454,099 | A | 9/1995 | Myers et al. | 395/575 |
| 5,479,654 | A | 12/1995 | Squibb | 395/600 |
| 5,487,160 | A | 1/1996 | Bemis | 395/441 |
| 5,497,483 | A | 3/1996 | Beardsley et al. | 395/575 |
| 5,513,314 | A | 4/1996 | Kandasamy et al. | 395/182.04 |
| 5,515,502 | A | 5/1996 | Wood | 395/182.13 |
| 5,524,205 | A | 6/1996 | Lomet et al. | 395/182.14 |
| 5,535,407 | A | 7/1996 | Yanagawa et al. | 395/800 |
| 5,544,320 | A | 8/1996 | Konrad | 395/200.09 |
| 5,559,991 | A | 9/1996 | Kanfi | 395/489 |
| 5,574,906 | A | 11/1996 | Morris | 395/601 |
| 5,586,322 | A | 12/1996 | Beck et al. | 395/616 |
| 5,604,862 | A | 2/1997 | Midgely et al. | 395/182.04 |
| 5,606,719 | A | 2/1997 | Nichols et al. | 395/876 |
| 5,640,561 | A | 6/1997 | Satoh et al. | 395/618 |
| 5,649,196 | A | 7/1997 | Woodhill et al. | 395/620 |
| 5,659,743 | A | 8/1997 | Adams et al. | 395/621 |
| 5,659,747 | A | 8/1997 | Nakajima | 395/651 |
| 5,696,901 | A | 12/1997 | Konrad | 395/200.09 |
| 5,751,936 | A | 5/1998 | Larson et al. | 395/182.05 |
| 5,754,844 | A | 5/1998 | Fuller | 395/606 |
| 5,765,173 | A | 6/1998 | Cane et al. | 707/204 |
| 5,771,354 | A | 6/1998 | Crawford | 395/200.59 |
| 5,778,395 | A | 7/1998 | Whiting et al. | 707/204 |
| 5,794,254 | A | 8/1998 | McClain | 707/204 |
| 5,802,264 | A | 9/1998 | Chen et al. | 395/182.04 |
| 5,802,297 | A | 9/1998 | Engquist | 395/200.42 |
| 5,842,224 | A | 11/1998 | Fenner | 711/202 |
| 5,943,443 | A | 8/1999 | Itonori et al. | 382/225 |
| 5,978,791 | A | 11/1999 | Farber et al. | 707/2 |
| 6,014,676 | A | 1/2000 | McClain | 707/204 |
| 6,016,553 | A | 1/2000 | Schneider et al. | 714/21 |
| 6,021,409 | A | 2/2000 | Burrows | 707/102 |
| 6,029,168 | A | 2/2000 | Frey | 707/10 |
| 6,085,298 | A | 7/2000 | Ohran | 711/162 |
| 6,122,754 | A | 9/2000 | Litwin et al. | 714/4 |
| 6,307,487 | B1 | 10/2001 | Luby | |
| 6,320,520 | B1 | 11/2001 | Luby | |

OTHER PUBLICATIONS http://amine-platform.sourceforge.net/component/kernel/lexicons.htm.*

Lossless compression of language model structure and word identifiers; Raj, B.; Whittaker, E.W.D.; Acoustics, Speech, and Signal Processing, 2003. Proceedings. (ICASSP '03). 2003 IEEE International Conference on vol. 1, Apr. 6-10, 2003 pp. 1-388-1-391 vol. 1.*

Progressive image transmission: an adaptive quadtree-pruning approach; Bajaj, C.L.; Guozhong Zhuang; Data Compression Conference, 1997. DCC '97. Proceedings Mar. 25-27, 1997 pp. 421.*

Asymmetric lossless image compression; Memon, N.D. Sayood, K.; Data Compression Conference, 1995. DCC '95. Proceedings Mar. 28-30, 1995 pp. 457.*

Tridgell, Andrew, Efficient Algorithms for Sorting and Synchronization, Apr. 2000, pp. i-viii, pp. 1-106.

Mogul, Jeffrey C., Douglis, Fred, Feldmann, Anja, Krishnamurthy, Balachander, "Potential benefits of delta encoding and data compression for HTTP" (Corrected version), WRL Research Report 97/4a, Western Research Laboratory, Palo Alto, California, Dec. 1997, pp. i-viii, 1-50.

* cited by examiner

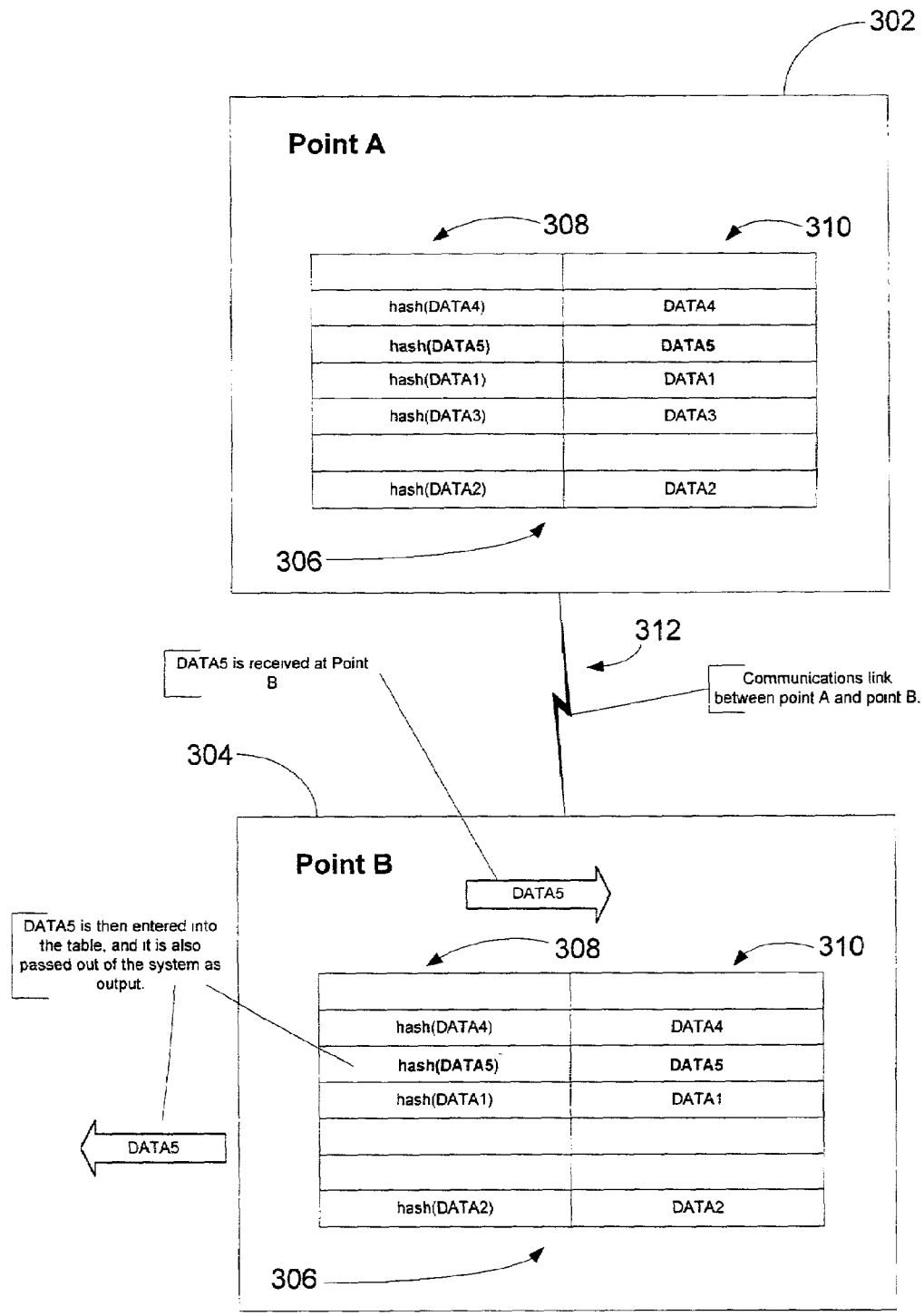
Fig. 3C    300

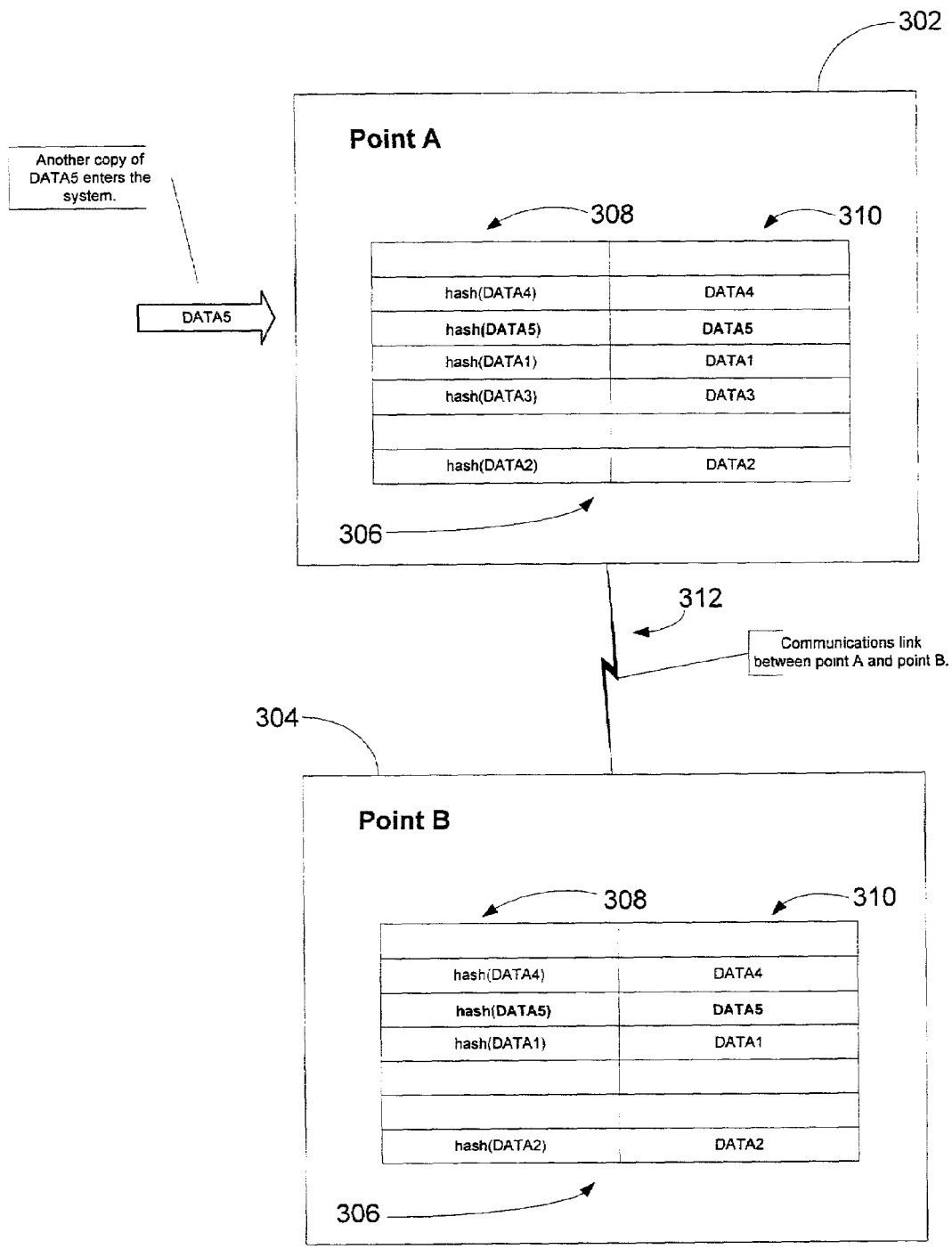
Fig. 3D     300

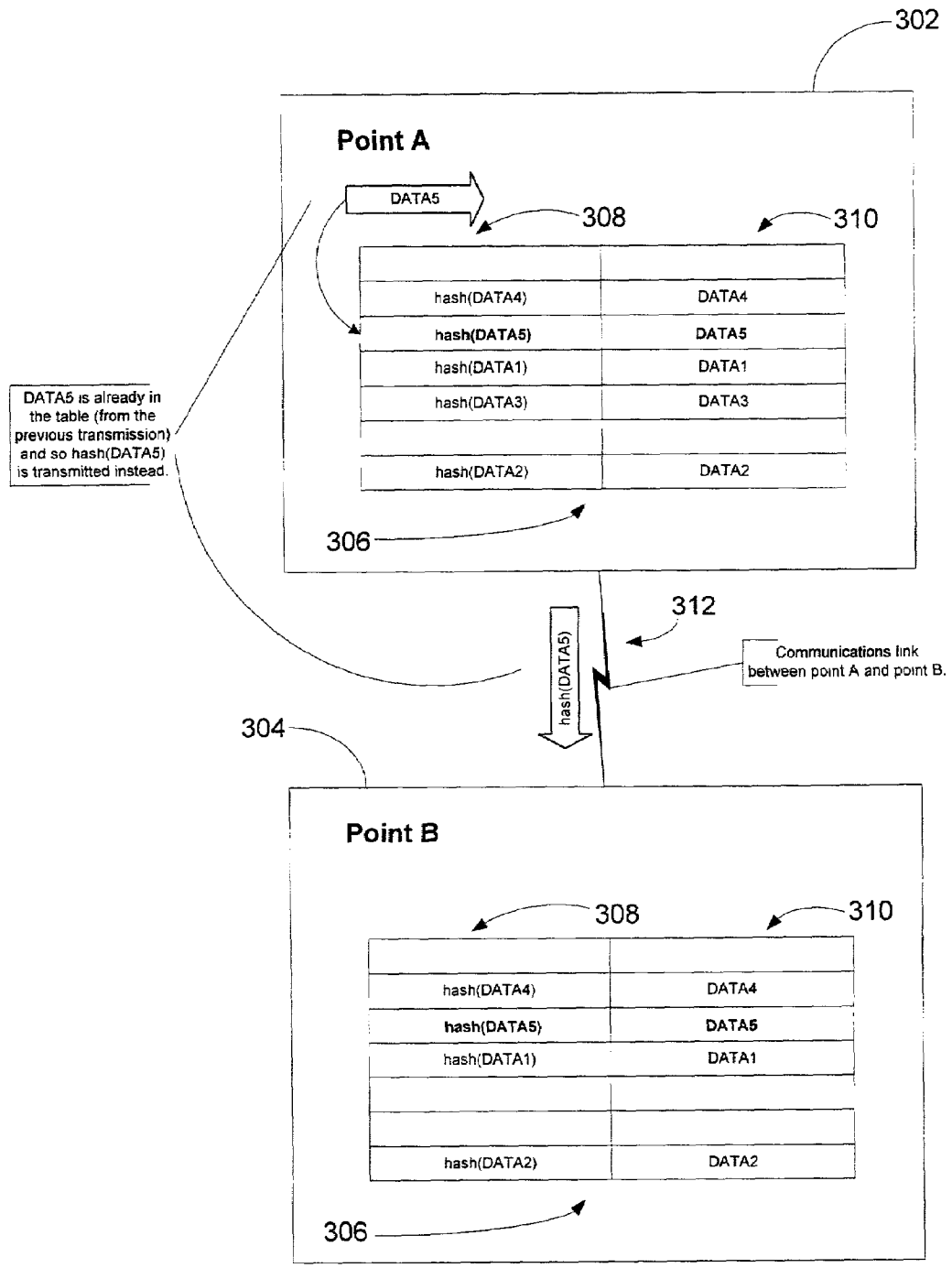
Fig. 3E        300

SYSTEM AND METHOD FOR REPRESENTING AND MAINTAINING REDUNDANT DATA SETS UTILIZING DNA TRANSMISSION AND TRANSCRIPTION TECHNIQUES

CROSS REFERENCE TO RELATED PATENT APPLICATIONS

The present invention claims priority from U.S. Provisional Patent Application Ser. No. 60/183,762 for: "System and Method for Decentralized Data Storage" filed Feb. 18, 2000, the disclosure of which is herein specifically incorporated by this reference. The present invention is also related to the subject matter disclosed in U.S. patent applications Ser. No. 09/777,149 filed Feb. 5, 2001 for: "System and Method for Unorchestrated Determination of Data Sequences Using Sticky Byte Factoring to Determine Breakpoints in Digital Sequences" and 09/777,150 filed Feb. 5, 2001 for: "Hash File System and Method for Use in a Commonality Factoring System", the disclosures of which are also herein specifically incorporated by this reference. The aforementioned patent applications are all assigned to Undoo, Inc., Irvine, Calif. assignee of the present invention.

BACKGROUND OF THE INVENTION

The present invention relates, in general, to the field of networked computers and computer systems. More particularly, the present invention relates to a uniquely efficient system and method for representing and maintaining redundant data sets utilizing DNA transmission and transcription techniques as herein disclosed.

Human language would not be possible without the use of words. Fundamentally, words are short utterances or symbols (or groups of symbols) that connote standardized meaning between the speaker and listener and serve as an effectively shorthand notation for their definitions (i.e. "dog" has a universal meaning in the English language). Language uses words to communicate efficiently, but that communication is dependent on the sender and receiver having a common database of meanings for these words. If the receiver does not recognize a particular word and the meaning it is intended to convey, the definition can ultimately be obtained from a common database (i.e. a dictionary).

The current state of computer data communications is entirely devoid of a language system and data transmissions generally consist of sending an entirely self-contained image. In other words, there is no universal, commonly-understood digital equivalent of "words". Computer communications, therefore, suffer under the tremendous burden of the need for sending extremely large amounts of data in a byte-by-byte format that ultimately serves to reduce the overall efficiency of all communications.

In present day computer systems, network bandwidth is a valuable and limited commodity wherein demand often exceeds supply. Moreover, as demands on available bandwidth increase faster than additional resources can be brought on line, supply will likely continue to lag demand for the foreseeable future. Moreover, current data transmission mechanisms, as previously noted, rely on conventional byte-by-byte transmission of data itself across the network and secure data transmission can only be approximated through the use of a variety of techniques to guarantee the integrity of transmitted data and reduce the risk of eavesdropping and interception. In any event, a certain amount of risk is nevertheless inherent in all known approaches.

SUMMARY OF THE INVENTION

Instead of the transfer of data on a byte-for-byte basis as is currently the state of the art, the system and method of the present invention advantageously implements the technique of system "DNA transmission" comprising a system for symbolic data exchange. In a particular embodiment, this may be effectuated utilizing one or more techniques disclosed in the aforementioned patent applications, including the hash file system ("HFS") lexicon implementing a one-to-one symbol to data translation table at every relevant branch point of a transmission stream. This enables construction of point-to-point or point-to-multipoint data transmissions comprising primarily the exchange of symbols shared by the lexicons involved in each leg of the transmission and only secondarily of data associated with symbols new to one or more of the involved lexicons. Consequently, the system and method of the present invention minimizes the amount of redundant data transmitted across the system.

Because, in an exemplary embodiment, hashes (or hashsums) may be utilized to generate and define the symbols in the system, overall security is improved since, for any hash-to-data pair, it is computationally impossible to regenerate the data from only the hash value without access to the translation table that maps the connection. Therefore, the system and method for representing and maintaining redundant data sets utilizing DNA transmission and transcription techniques provides a means for securely creating and maintaining a universal "dictionary" of unique identifiers (e.g. hashes or hashsums) and the corresponding data they represent.

In accordance with the present invention, a system and method is provided for moving and storing data that allows networked computers or other devices to communicate through the synchronization of unique identifiers (e.g. hashes or hashsums) for the digital sequences (e.g. data, video streams etc.) that they represent. This system vastly decreases the amount of total data movement otherwise required between computers for accurate data communication without loss of data integrity.

In a representative embodiment, the system may comprise partially synchronized databases or translation tables capable of entering data based on its unique identifier (or a list of unique identifiers, or a recipe for combining data associated with unique identifiers) and retrieving data based on its unique identifier or list of unique identifiers or a recipe. A sender (or server) application is capable of breaking a digital sequence of data (e.g. disk blocks, files, still pictures, graphics, images, audio or video streams, network traffic, databases, directories, entire systems, entire data centers etc.) into a hash or set of hashes in concert with the partially synchronized databases. A receiver (or client) application is capable of converting the hashes or set of hashes back into the data sequenced using one of these translation tables.

The system and method of the present invention is implemented by means of unique identifiers (e.g. hashes or hashsums) which comprise numbers within a range large enough to reduce the chance of random collisions to an acceptably small error rate. The sender application partitions digital sequences (e.g. data etc.) using a standardized means to increase the likelihood of matching existing sequences in the shared database using a method such as "sticky byte" factoring disclosed and claimed in the aforementioned patent application for: "System and Method for Unorchestrated Determination of Data Sequences Using Sticky Byte Factoring to Determine Breakpoints in Digital Sequences".

The unique identifiers may be managed in association with digital sequence chunks in accordance with the disclosure of the aforementioned patent application for: "Hash File System and Method for Use in a Commonality Factoring System".

In general, what has been disclosed herein is a system and method for moving and storing data that allows networked computers or other devices to communicate through symbolic exchange (i.e. the unique identifiers), vastly decreasing the amount of total data movement necessary for accurate communication without loss of data integrity. A client application is capable of sequencing digital sequences (e.g. blocks of data, files, directories, entire systems, and entire data centers etc.) into a comparatively smaller string or strings of binary digits (system DNA) unique to that original set of data. In addition, a server application comprises a "Primordial Data Pool" (also referred to as a "DNA Lexicon"), comprising "Binary Building Blocks" capable of reconstituting the entire digital sequence (e.g. files, systems, and sets of data etc.) when provided with the system DNA under the proper, or an otherwise acceptable, reconstitution protocol. Optionally, a secure transmission protocol may be implemented between the client and server applications that allows for the fully encrypted exchange of data over public or non-public network connections such as the Internet.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein:

FIG. 3C is a follow-on illustration of the DNA transmission points of the preceding figures wherein new DATA5 and its hashsum has been entered into the table of Point B and further passed on as an output of the system;

FIG. 3D is a follow-on illustration of the DNA transmission points of the preceding figures wherein another copy of new DATA5 enters the system at Point A;

FIG. 3E is a follow-on illustration of the DNA transmission points of the preceding figures wherein, since DATA5 is already in the table of Point A, the hashsum of DATA5 is transmitted to Point B over the communications link;

DESCRIPTION OF A REPRESENTATIVE EMBODIMENT

Figure 1:
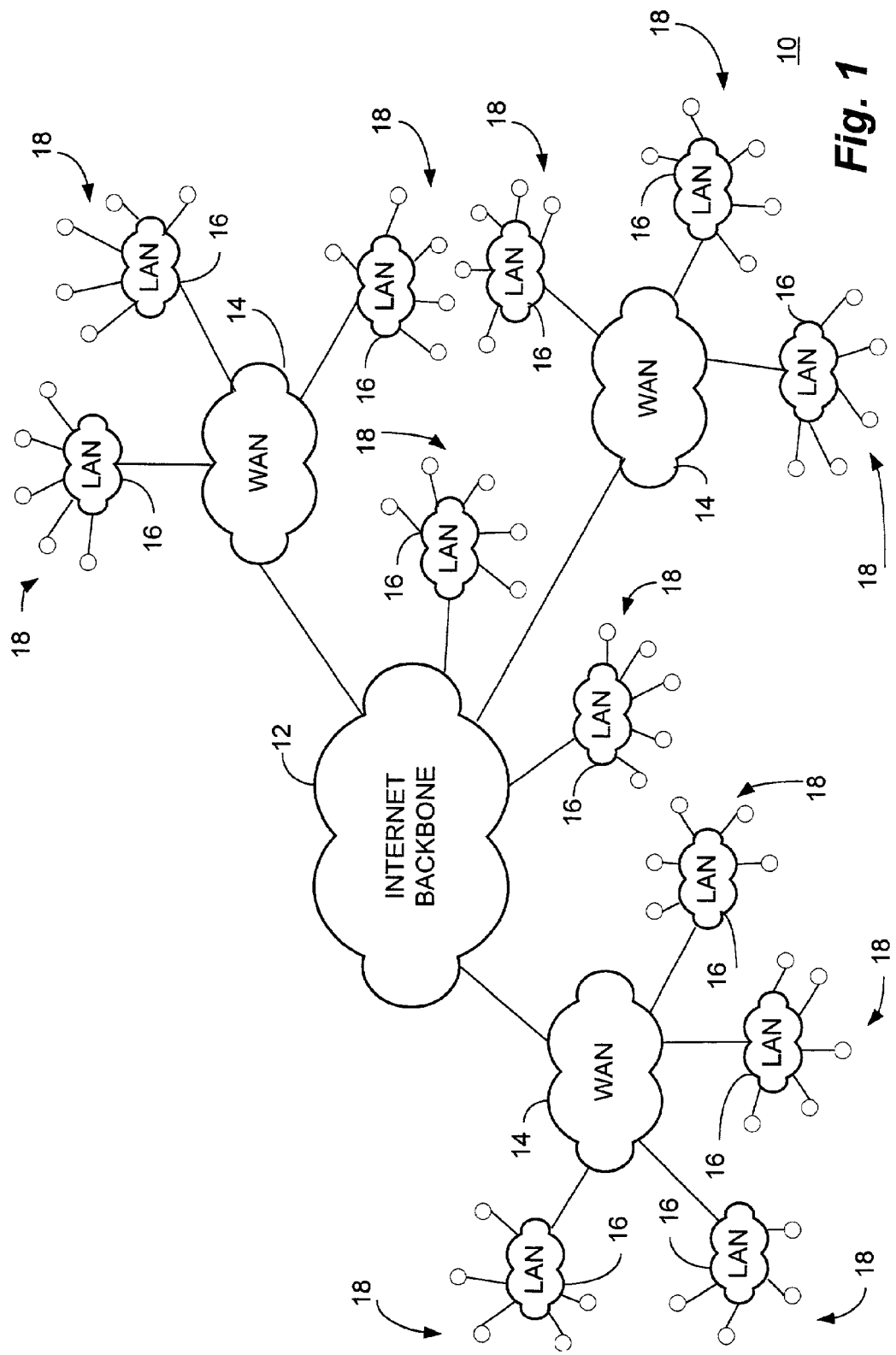
FIG. 1 is a high level illustration of a representative networked computer environment in which the system and method of the present invention may be implemented.

With reference now to FIG. 1, the present invention may be utilized in conjunction with a novel data storage system on an internetwork 10. In this figure, an exemplary internetwork environment 10 may include the Internet which comprises a global internetwork formed by logical and physical connection between multiple wide area networks ("WANs") 14 and local area networks ("LANs") 16. An Internet backbone 12 represents the main lines and routers that carry the bulk of the data traffic. The backbone 12 is formed by the largest networks in the system that are operated by major Internet service providers ("ISPs") such as GTE, MCI, Sprint, UUNet, and America Online, for example. While single connection lines are used to conveniently illustrate WANs 14 and LANs 16 connections to the Internet backbone 12, it should be understood that in reality, multi-path, routable physical connections exist between multiple WANs 14 and LANs 16. This makes internetwork 10 robust when faced with single or multiple failure points.

In general terms, a "network" comprises a system of general purpose, usually switched, physical connections that enable logical connections between processes operating on nodes 18. The physical connections implemented by a network are typically independent of the logical connections that are established between processes using the network. In this manner, a heterogeneous set of processes ranging from file transfer, mail transfer, and the like can use the same physical network. Conversely, the network can be formed from a heterogeneous set of physical network technologies that are invisible to the logically connected processes using the network. Because the logical connection between processes implemented by a network is independent of the physical connection, internetworks are readily scaled to a virtually unlimited number of nodes over long distances.

In a particular implementation of the present invention, storage devices holding DNA Lexicon translation tables may, for example, be placed at nodes 18. The storage at any node 18 may comprise a quantity of RAM, single hard drive, or may comprise a managed storage system such as a conventional RAID device having multiple hard drives configured as a single logical volume. Optionally, one or more of the nodes 18 may implement storage allocation management ("SAM") processes that manage data storage across nodes 18 in a distributed, collaborative fashion. SAM processes preferably operate with little or no centralized control for the system as whole. SAM processes provide data distribution across nodes 18 and implement recovery in a fault-tolerant fashion across network nodes 18 in a manner similar to paradigms found in RAID storage subsystems.

However, because SAM processes operate across nodes rather than within a single node or within a single computer, they allow for greater fault tolerance and greater levels of storage efficiency than conventional RAID systems. For example, SAM processes can recover even where a network node 18, LAN 16, or WAN 14 become unavailable. Moreover, even when a portion of the Internet backbone 12 becomes unavailable through failure or congestion, the SAM processes can recover using data distributed on nodes 18 that remain accessible.

Figure 2:
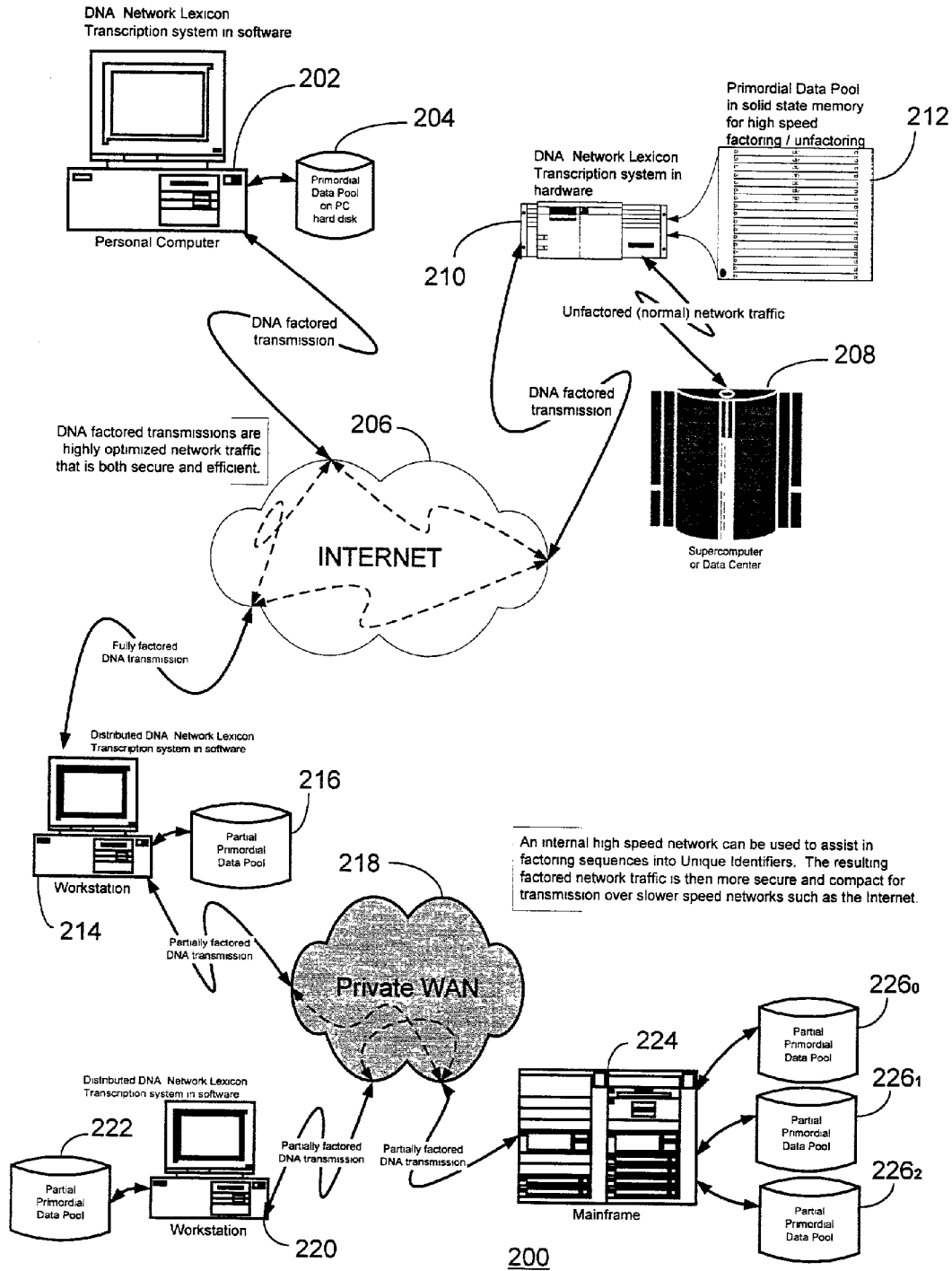
FIG. 2 is a more detailed conceptual representation of a possible operating environment for utilization of the system and method of the present invention wherein a number of computer systems are illustrated as communicating utilizing factored DNA transmissions either in isolation or in a distributed fashion.

With reference additionally now to FIG. 2, a more detailed conceptual representation of a possible operating environment 200 for utilization of the system and method of the present invention is shown wherein a number of computer systems are illustrated as communicating utilizing factored DNA transmissions either in isolation or in a distributed fashion. The operating environment 200 illustrated is solely exemplary in nature and in no way limiting as to the possible applications of the system and method of the present invention.

As shown, a representative computer system, such as personal computer 202, may include a DNA network lexicon transcription system embodied in locally resident software in conjunction with a local primordial data pool stored on the personal computer 202 hard disk 204. The personal computer 202 is shown as coupled to the Internet 206 (or any other type of computer communications network) and capable of transmitting and receiving DNA factored transmissions in accordance with the present invention, as will be more fully described hereinafter. DNA factored transmissions comprise highly optimized network traffic utilizing unique identifiers that are both secure and highly efficient.

Further illustrated is, for example, a super computer or data center 208 (or any other type of computer system) which may be coupled to the Internet 206 by means of a supplementary network coupled server 210. The computer 208 may communicate with the server 210 through conventional unfactored (or normal) communications protocols. The server 210 in conjunction with, for example, a very fast access speed solid state memory 212 comprising a locally accessible primordial data pool may serve as a hardware based DNA network lexicon transcription system and associated primordial data pool to provide high speed DNA factoring and unfactoring functions (also denominated as "transcription" or "reconstitution" operations herein) also as more fully described hereinafter. As before, the computer system comprising the computer 208, network server 210 and primordial data pool 212 are capable of transmitting and receiving DNA factored transmissions with other Internet 206 coupled computer systems. The transcription and reconstitution process are depicted using a hardware based device 210 and a software based method in the Personal Computer 202 to illustrate that compatibility between DNA Lexicons are independent of the speed or means by which they are factored.

The operating environment 200 may further comprise, for example, a set of computers 214, 220, 224 working cooperatively via a private WAN 218. While DNA factoring can be done without cooperation, DNA reconstitution commonly requires requesting numeric sequences not present in the Lexicon translation table. While these numeric sequences can be supplied by any source (trusted or untrusted), transmitting them takes time. DNA reconstitution therefore benefits from quick access to numeric sequences and the high speed private WAN 218 is shown as an example of how a set of computers 214, 220, 224 can be used to efficiently serve requests for numeric sequences.

The term "Partial Primordial Data Pool" is used to indicate that systems can partition a single DNA Lexicon across the storage resources of separate systems 216, 222 and 226. Partitioning can be more effective particularly when there are disparate network connections 218 and 206. Instead of a system holding an isolated DNA Pool 204 covering the entire range of possible unique identifiers, a set of systems can partition that space, each managing a subrange but collectively covering the entirety of values. Such a practice can reduce the requests for numeric sequences sent over a slow speed network 206 by serving them over a local high speed network 218.

A "Partial Primordial Data Pool" configuration 216, 222, 226$_0$, 226$_1$, 226$_2$ may also be used in conjunction with isolated complete primordial data pools. Systems holding both types would be capable of reconstituting most local network 218 traffic to accelerate local communications while resorting to communal, partial translation tables to reduce requests over slow speed network connections 206.

Full or partial primordial data pools can be lost or corrupted without compromising DNA transmission or reception. This is because unique identifiers provide an implicit validity check. The unique identifier for any digital or numeric sequence can be readily produced making verification autonomous. A corrupted Lexicon translation table can be used by simply preserving those entries that are valid, while removing those entries which are not. In the case of lost translation tables, the system functions as if all unique identifiers are not locally known, necessitating transmission of all data associated with each unique identifier. With proper selection of numeric sequence size, this overhead can be kept below a few percent of unfactored traffic volume.

Figure 3A:
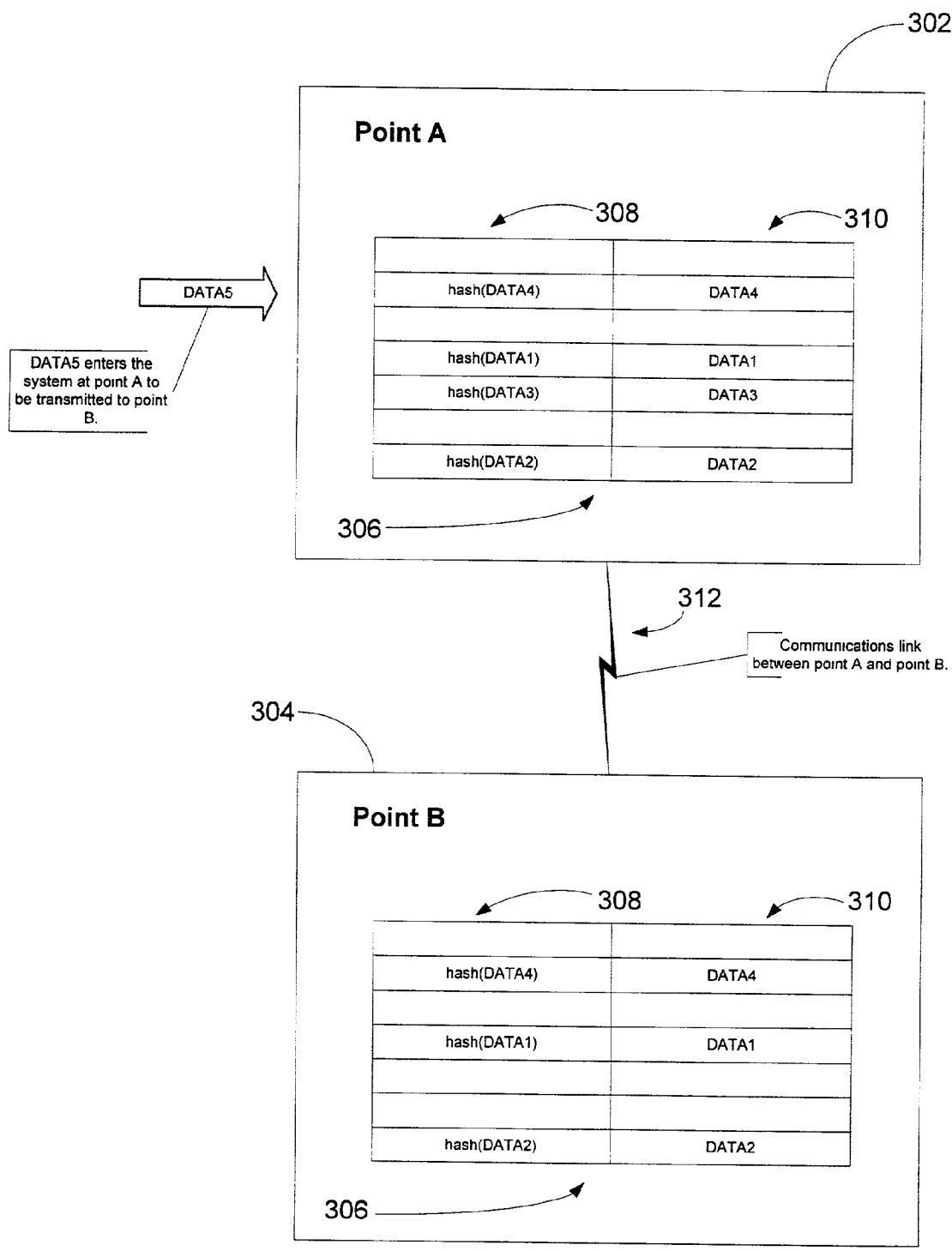
FIG. 3A is a representative pair of DNA transmission points illustrated for purposes of implementing an exemplary data transmission and/or storage operation in accordance with the technique of the present invention, wherein Points A and B are in a state of partial synchronization with the table at Point A containing DATA3 and its corresponding hashsum, neither of which are currently found in the table of Point B.

With reference additionally now to FIG. 3A, a representative pair of DNA transmission points comprising at least a portion of a system 300 are illustrated for purposes of implementing an exemplary data transmission and/or storage operation in accordance with the technique of the present invention. In this example, Point A 302 and Point B 304 are in a state of partial synchronization wherein the table 306 at Point A 302 contains the element DATA3 in one portion 310 thereof and its corresponding hashsum, [hash (DATA3)] in a corresponding other portion 308 thereof. As illustrated in this example, neither DATA3 nor hash (DATA3) are currently found in the corresponding portions 310 and 308 of the table 306 of Point B 304. Also as illustrated, a communications link 312, such as the Internet or other communications medium, couples the Points A 302 and B 304 for exchange of data, hashsums or other information.

In this particular figure, new data (DATA5) enters the system 300 at Point A 302 which is thereafter to be transmitted via the communications link 312 to Point B 304. Specifically new data can be any digital or numeric sequence that has not previously or recently been seen at Point A 302. The method described herein is not dependent on having a complete or even accurate history of the transmissions between Point A 302 and Point B 304. The table 306 at Point A 302 is depicted containing various data elements from previous transmissions. This table 306 maybe large or small to operate within the constraints of a particular implementation. The table 306 space can be managed with industry standard techniques such as LRU (Least Recently Used) to remove old items in preference to new ones. Other methods of managing the table 306 space are also possible.

Figure 3B:
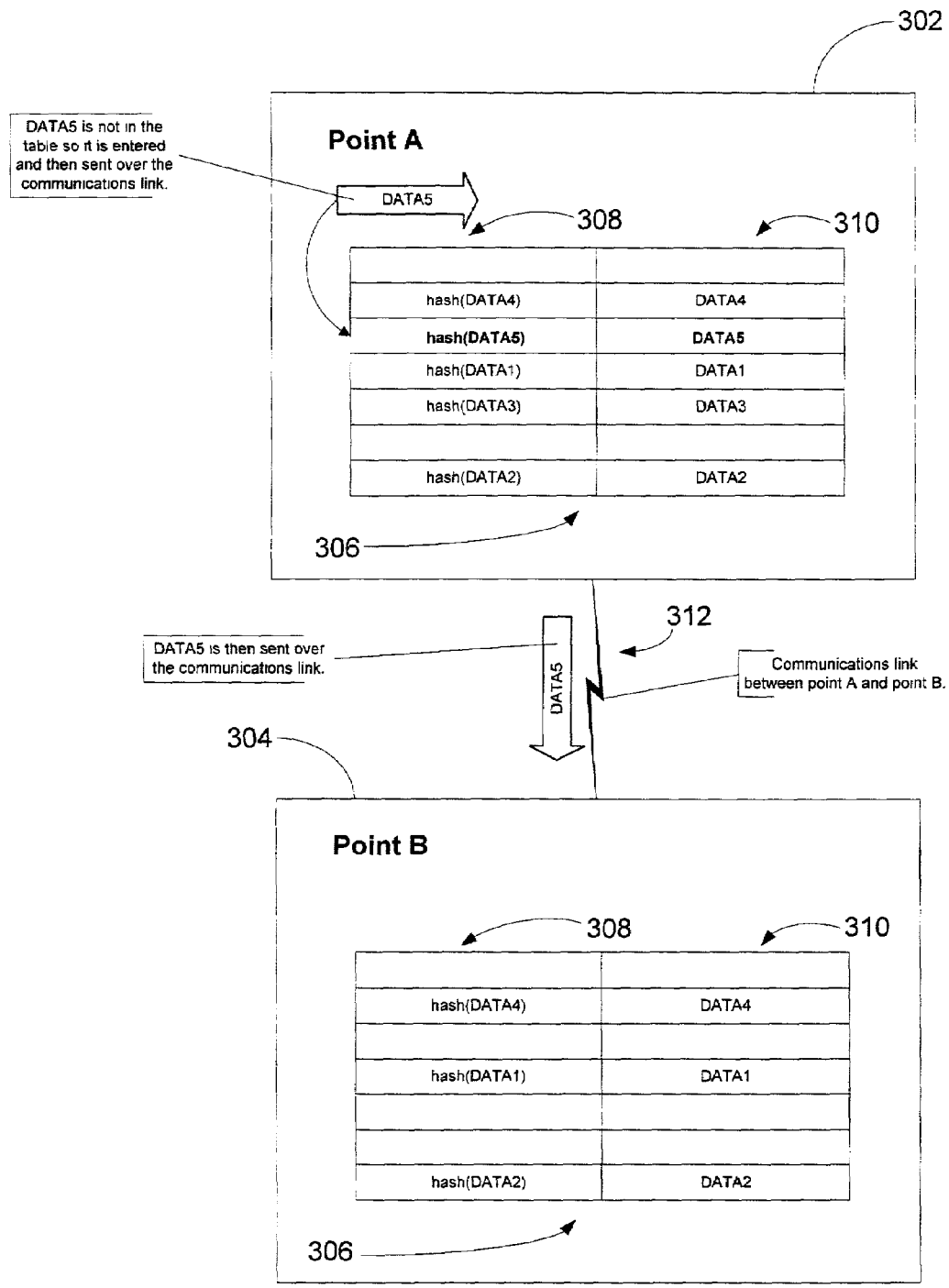
FIG. 3B is a follow-on illustration of the DNA transmission points of the preceding figure wherein new DATA5 has been entered into the table of Point A and transmitted over a communications link to Point B.

With reference additionally now to FIG. 3B, a follow-on illustration of the DNA transmission points 302 and 304 of the preceding figure is shown wherein new DATA5 has been entered into the table 306 of Point A 302 and transmitted over the communications link 312 to Point B 304. Also as shown, since DATA5 has not been previously entered into the table 306 of Point A 302, it is entered into the portion 310 of table 306 and its corresponding hashsum (hash(DATA5)) is entered into the corresponding portion 308 of table 306 at Point A 302.

Note that the tables 306 at both Point A 302 and Point B 304 can be implemented as standard computer hash table data structures in software, or as associative arrays in hardware. Both data structures allow for rapid checking for existing hashes (Unique Identifiers) and for translating hashes back into their associated digital or numeric sequences.

With reference additionally now to FIG. 3C, a follow-on illustration of the system 300 comprising the DNA transmission points 302 and 304 of the preceding figures is shown wherein new DATA5 and its corresponding hashsum has now been entered into the respective portions 310 and 308 of the table 306 of Point B 304. DATA5 may then be further passed on as an output to one or more other points (not shown) of the system 300.

An important point of the series of the preceding figures (FIGS. 3A, 3B and 3C) is that data was passed across the communications link 312 without changing its underlying structure or representation. The traffic transmitted was not reduced in the example so far, but the tables 306 at both Point A 302 and Point B 304 have been synchronized with data that can be used to improve future communications as is shown in the next series of figures.

With reference additionally now to FIG. 3D, a follow-on illustration of the DNA transmission points 302 and 304 of the preceding figures is shown wherein another copy of new DATA5 subsequently enters the system 300 at Point A 302. It is important to note that this figure does not necessarily represent a point in time immediately after FIG. 3C. Instead, FIG. 3D could represent the state of the two Points A 302 and B 304 at some time after many transmissions like the one depicted in FIGS. 3A, 3B and 3C have taken place. Rather, this figure is meant to depict the state in which both Point A 302 and Point B 304 each have a copy of DATA5 already present in their respective tables 306.

With reference additionally now to FIG. 3E, a follow-on illustration of the DNA transmission points 302 and 304 of the preceding figures is shown wherein, since DATA5 has previously been entered into the table 306 of Point A 302, its hashsum (instead of DATA5 itself) is then transmitted to Point B 304 over the communications link 312.

Figure 3F:
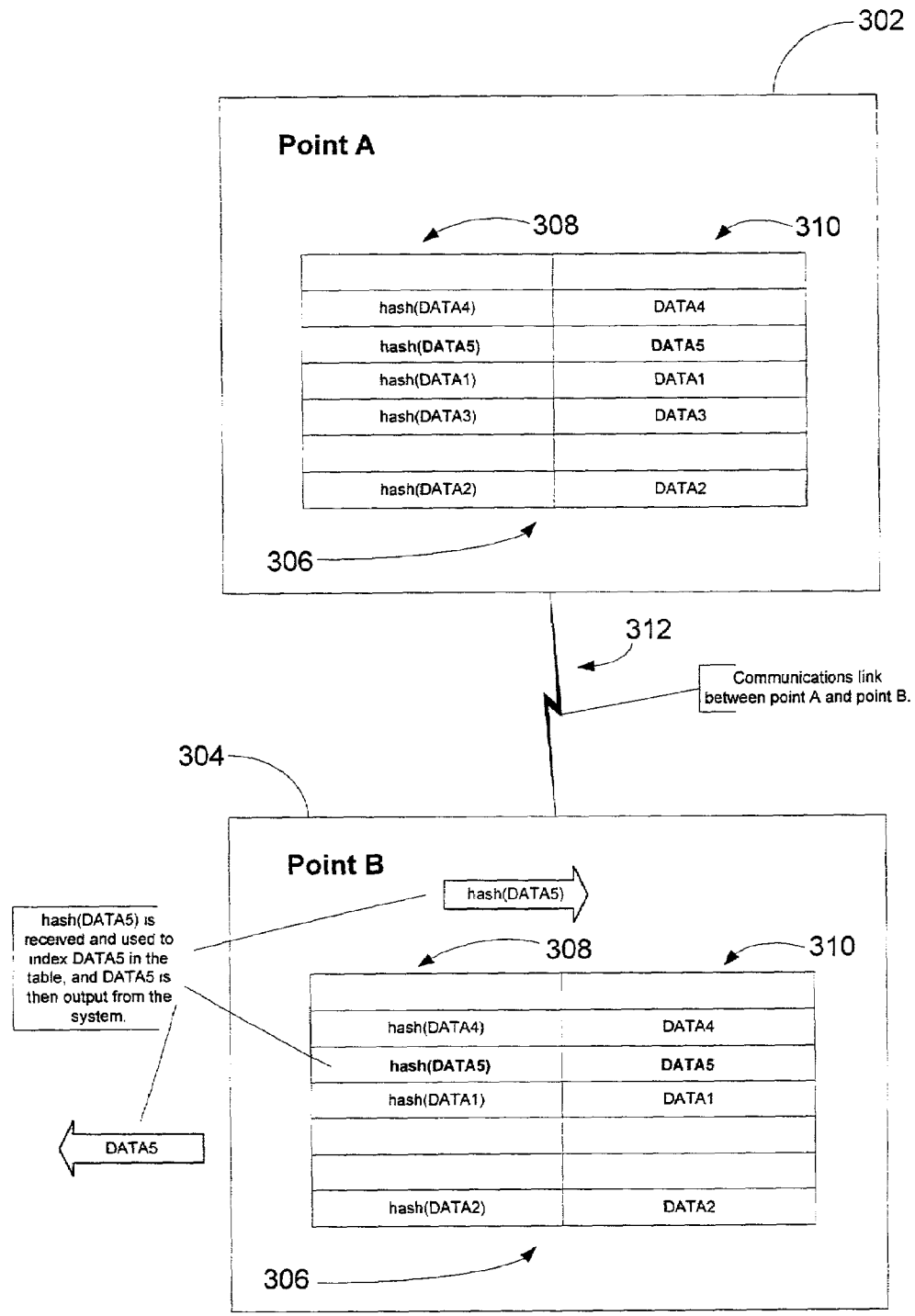
FIG. 3F is a follow-on illustration of the DNA transmission points of the preceding figures wherein the hashsum of DATA5 is received at Point B and used to index DATA5 in its table with DATA5 being further passed on as an output of the system.

With reference additionally now to FIG. 3F, a follow-on illustration of the DNA transmission points 302 and 304 of the preceding figures is shown wherein the hashsum of DATA5 (hash(DATA5)) is received at Point B 304 and used to index DATA5 in its table 306 with DATA5 then being further passed on as an output of the system 300 to other possible points therein.

Figure 3G:
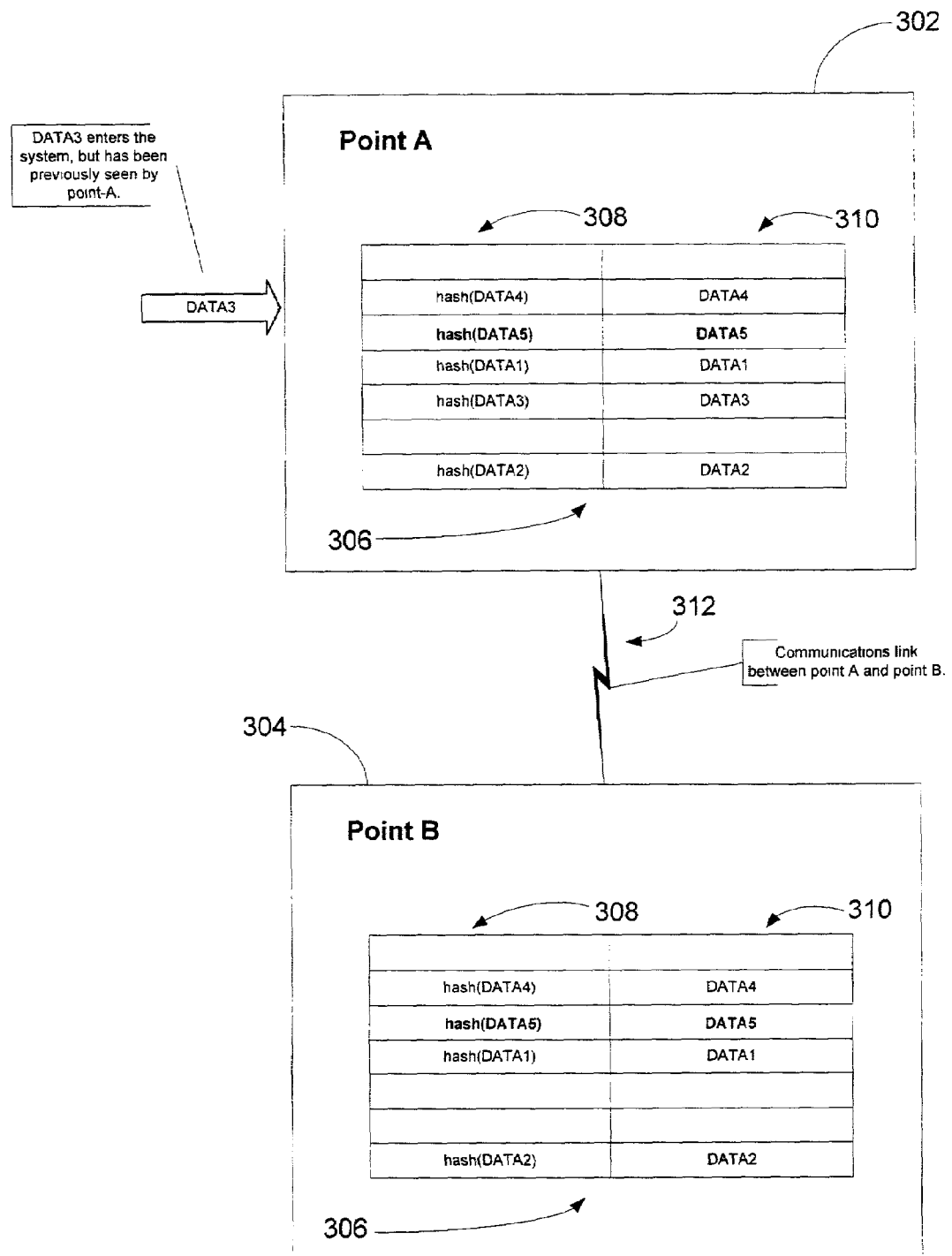
FIG. 3G is a follow-on illustration of the DNA transmission points of the preceding figures wherein DATA3 again enters the system at Point A but has previously been entered into its table.

It should be noted that the preceding series of three figures (FIGS. 3D, 3E and 3F) illustrate that data on the communications channel or link 312 has been factored. If DATA5 requires significantly more communications resources to transmit than does hash(DATA5), then the communications cost has been correspondingly reduced. For example if DATA5 were 4,096 bytes in length and hash(DATA5) were 20 bytes in length, then the communications cost may have been reduced by a substantial amount (depending on the content of DATA5 and on other communications optimizations). With reference additionally now to FIG. 3G, a follow-on illustration of the DNA transmission points 302 and 304 of the preceding figures is shown wherein DATA3 again enters the system at Point A 302 but has previously been entered into its table 306 but not in the table 306 of Point B. There are a variety of possible reasons for why Point A 302 would have a copy of DATA3 while Point B 304 does not, including, without limitation: Point B 304 may have purged DATA3 from its table 306 due to limited space in its table 306; Point B 304 may have been reinitialized following power cycle and so not have seen DATA3 since start; Point A 302 may have multiple connections to other points not depicted, and so hold data transmitted to those points; Point B 304 may have suffered data corruption and therefore have a corrupted version of DATA3.

Figure 3H:
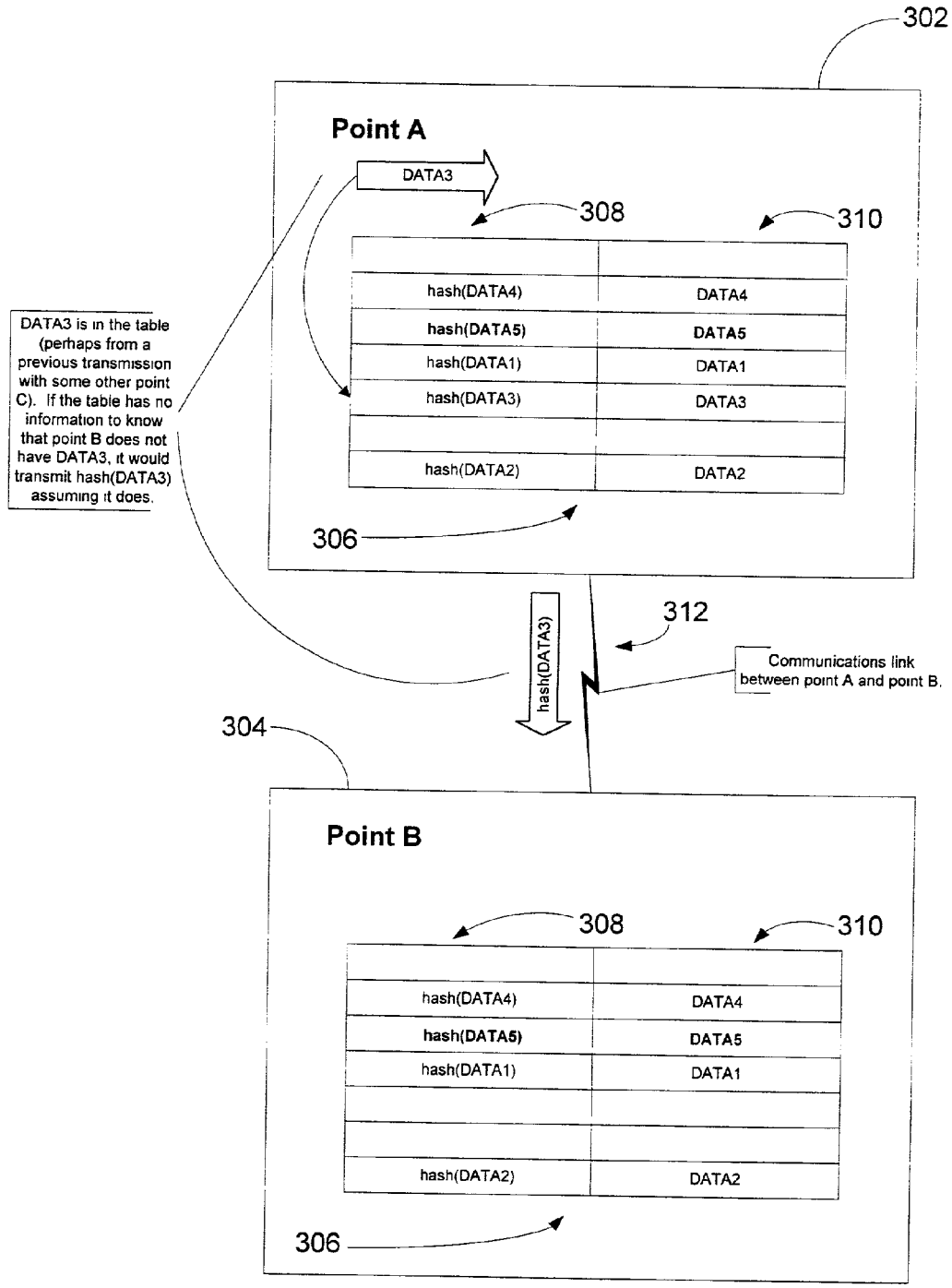
FIG. 3H is a follow-on illustration of the DNA transmission points of the preceding figures wherein Point A transmits the hashsum of DATA3 to Point B in the absence of any indication that Point B does not have DATA3, with the assumption being that it does.

With reference additionally now to FIG. 3H, a follow-on illustration of the DNA transmission points 302 and 304 of the preceding figures is shown wherein Point A 302 transmits the hashsum of DATA3 (hash(DATA3)) to Point B 304 in the absence of any indication that Point B 304 does not already have DATA3 in its table 306., with the assumption being that it does.

Figure 3I:
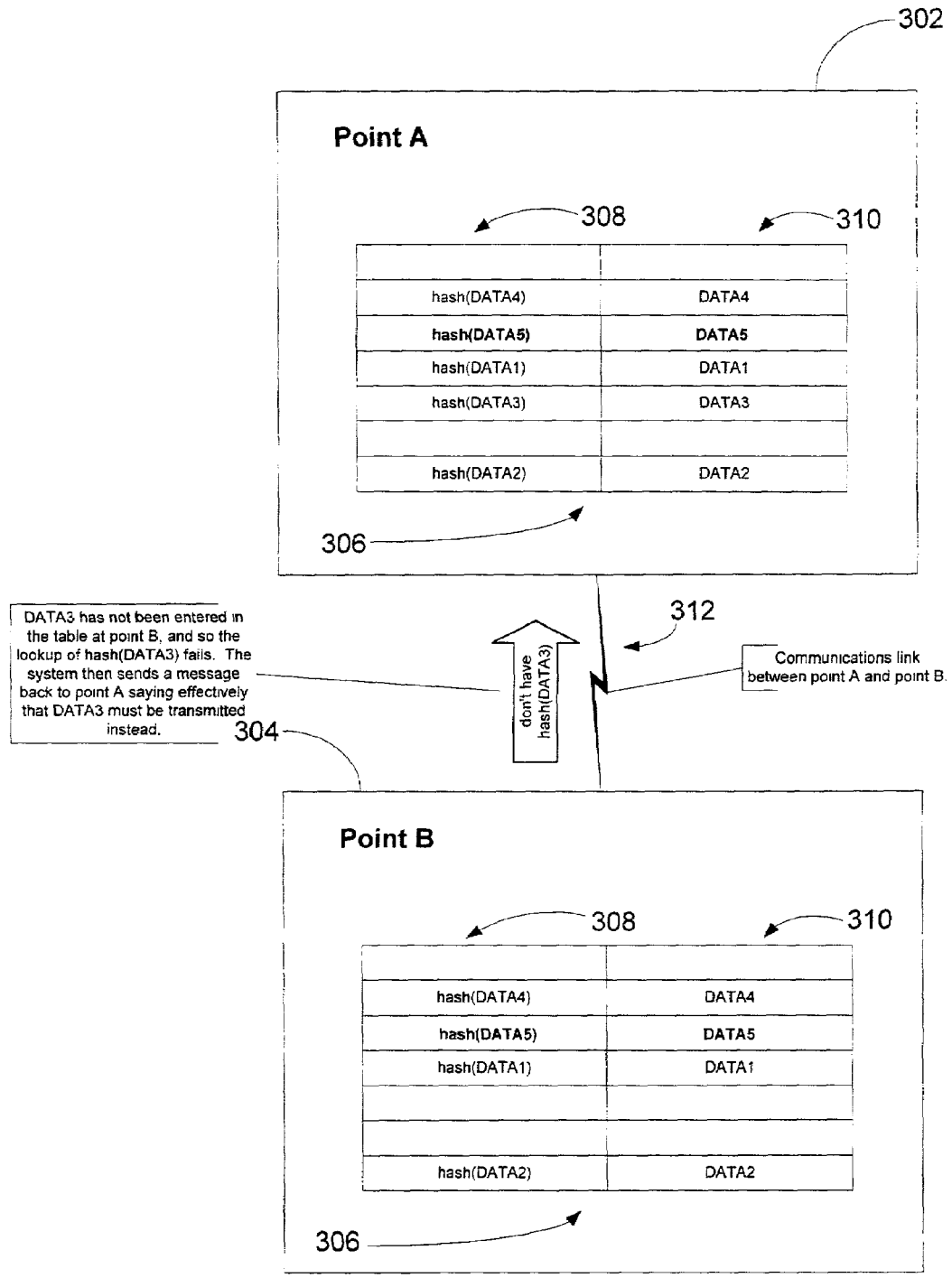
FIG. 3I is a follow-on illustration of the DNA transmission points of the preceding figures wherein DATA3 has not been previously entered in the table at Point B, so the lookup of the hashsum of DATA3 fails and Point B returns a message to Point A to indicate that DATA3 must be transmitted instead.

With reference additionally now to FIG. 3I, a follow-on illustration of the DNA transmission points 302 and 304 of the preceding figures is shown wherein, since DATA3 has not been previously entered in the table 306 at Point B 304, the lookup of the hashsum of DATA3 fails. At this time, Point B 304 then returns a message to Point A 302 over the communications link 312 to indicate that DATA3 itself must be transmitted instead of its hashsum.

Figure 3J:
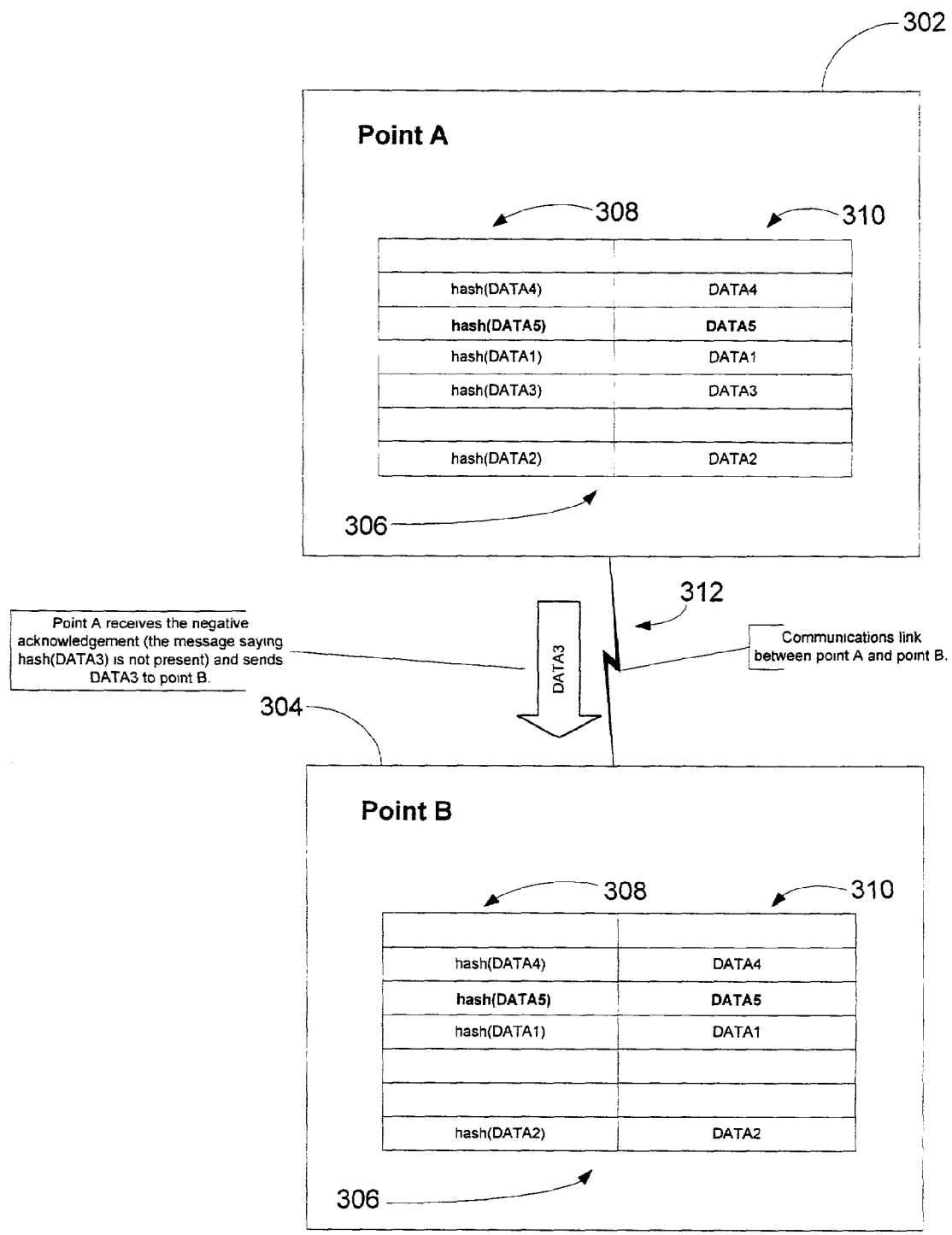
FIG. 3J is a follow-on illustration of the DNA transmission points of the preceding figures wherein Point A has received the message from Point B indicating that the hashsum of DATA3 is not present in the table of Point B and Point A then sends DATA3 to Point B.

With reference additionally now to FIG. 3J, a follow-on illustration of the DNA transmission points 302 and 304 of the preceding figures is shown wherein Point A 302 has received the message from Point B 304 indicating that the hashsum of DATA3 (hash(DATA3)) is not present in the table 306 of Point B 304 and Point A 302 then transmits DATA3 itself to Point B 304.

Figure 3K:
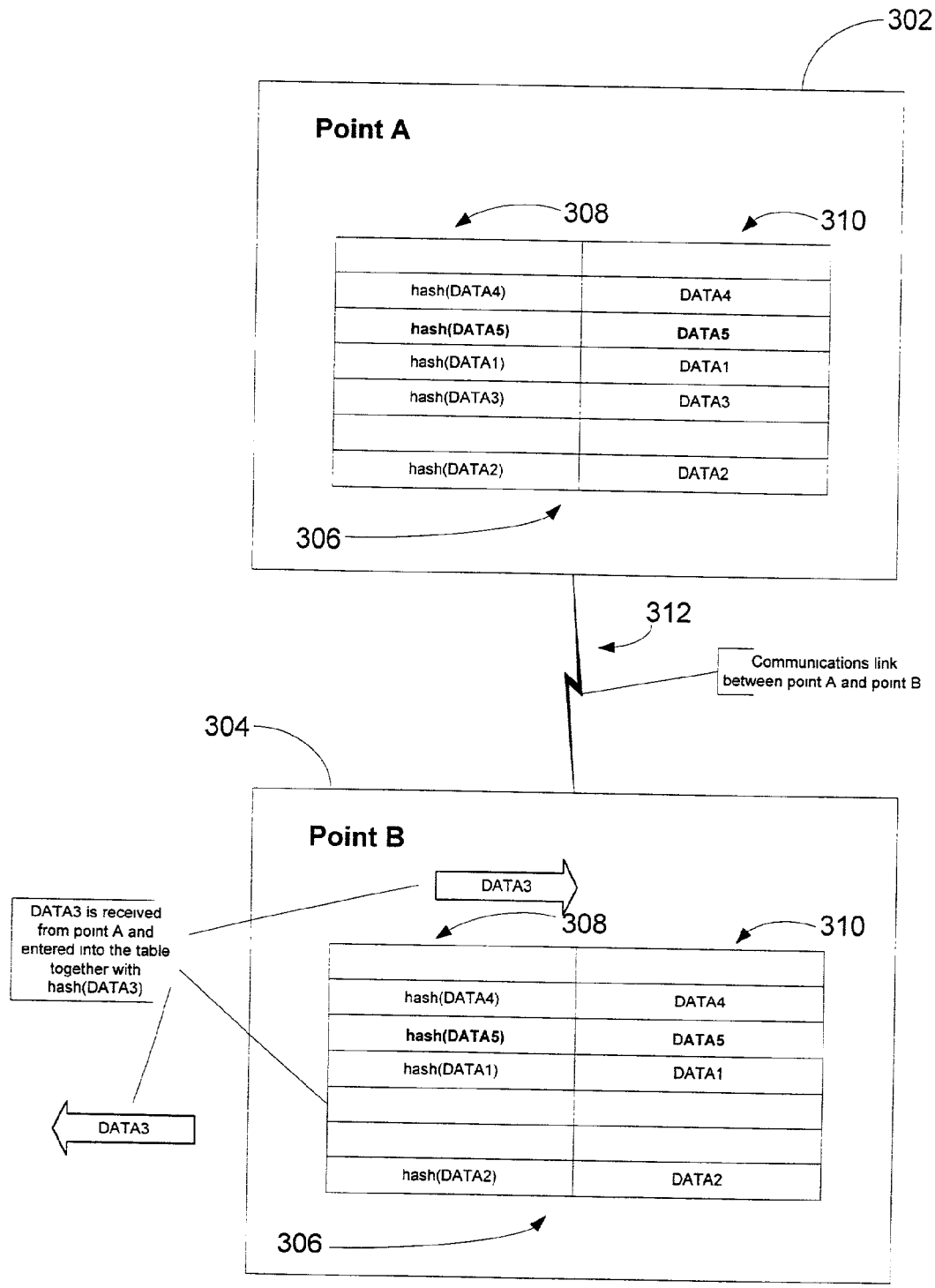
FIG. 3K is a follow-on illustration of the DNA transmission points of the preceding figures wherein DATA3 is received at Point B over the communications link and entered into its table along with the corresponding hashsum of DATA3.

With reference additionally now to FIG. 3K, a follow-on illustration of the DNA transmission points 302 and 304 of the preceding figures is shown wherein DATA3 is now received at Point B 304 over the communications link 312 and is to be entered into its table 306.

One important point of the series of FIGS. 3G through 3K is that the tables 306 at Point A 302 and Point B 304 do not require synchronization, but instead are tolerant of missing table 306 elements and are, therefore, fault tolerant. Furthermore, DNA transmission does not need to be implemented in a point-to-point configuration because it also improves point-to-multipoint transmissions as well. Although not shown, Point B 304 need not have requested DATA3 from Point A 302 upon discovering it missing in table 306. Point A 302 could have requested DATA3 from any other point (not shown) instead. The ability to request data from points other than that originating the transmission serves to make DNA transmission highly distributable across highly interconnected networks.

A request to send data associated with hash(DATA3) does not have to be answered with DATA3 but may instead be answered with, for example: a list of hashes whose associated data together combine to create DATA3; or a recipe for editing some data present at Point B 304 that will result in creating DATA3.

Figure 3L:
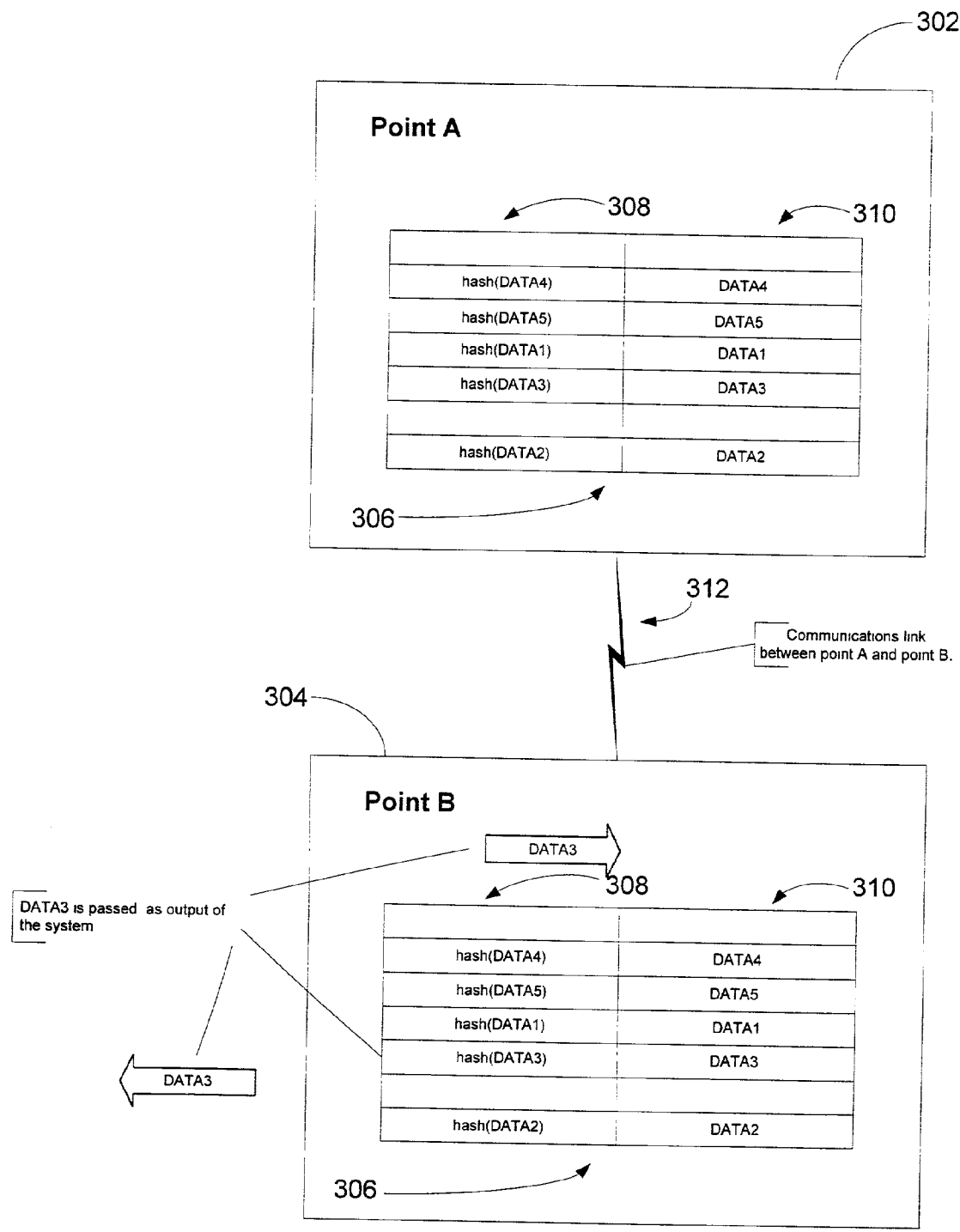
FIG. 3L is a follow-on illustration of the DNA transmission points of the preceding figures wherein DATA3 is further passed on from Point B as an output of the system.

With reference additionally now to FIG. 3L, a follow-on illustration of the DNA transmission points 302 and 304 of the preceding figures is shown wherein DATA3 has now been entered into the portion 310 of table 306 at Point B 304 along with its corresponding hashsum in portion 308 of table 306. DATA3 may now be passed on from Point B 304 as output to any other point within the system 300.

Note that what has also been demonstrated in FIGS. 3G through 3L is a DNA transmission negative acknowledgement (failure) and recovery. Whereas FIG. 3G shows tables 306 being unsynchronized with respect to DATA3, FIG. 3L shows tables 306 in synchronization with respect to DATA3. If instead of sending the request for DATA3 to Point A 302, Point B 304 had instead sent a request for DATA3 to some other point (not shown) and received DATA3 from that other point, then DATA3 would have appeared to have traversed the communications link 312 between Point A 302 and Point B 304 without having physically done so. This feature of DNA transmission means that communication links 312 can logically (or effectively) transmit data not physically (or actually) transmitted. For expensive long haul communication links 312, for example a trans-Atlantic link, the use of large DNA lexicons at the end points of such a link can greatly decrease actual communications resource utilization.

Figure 4:
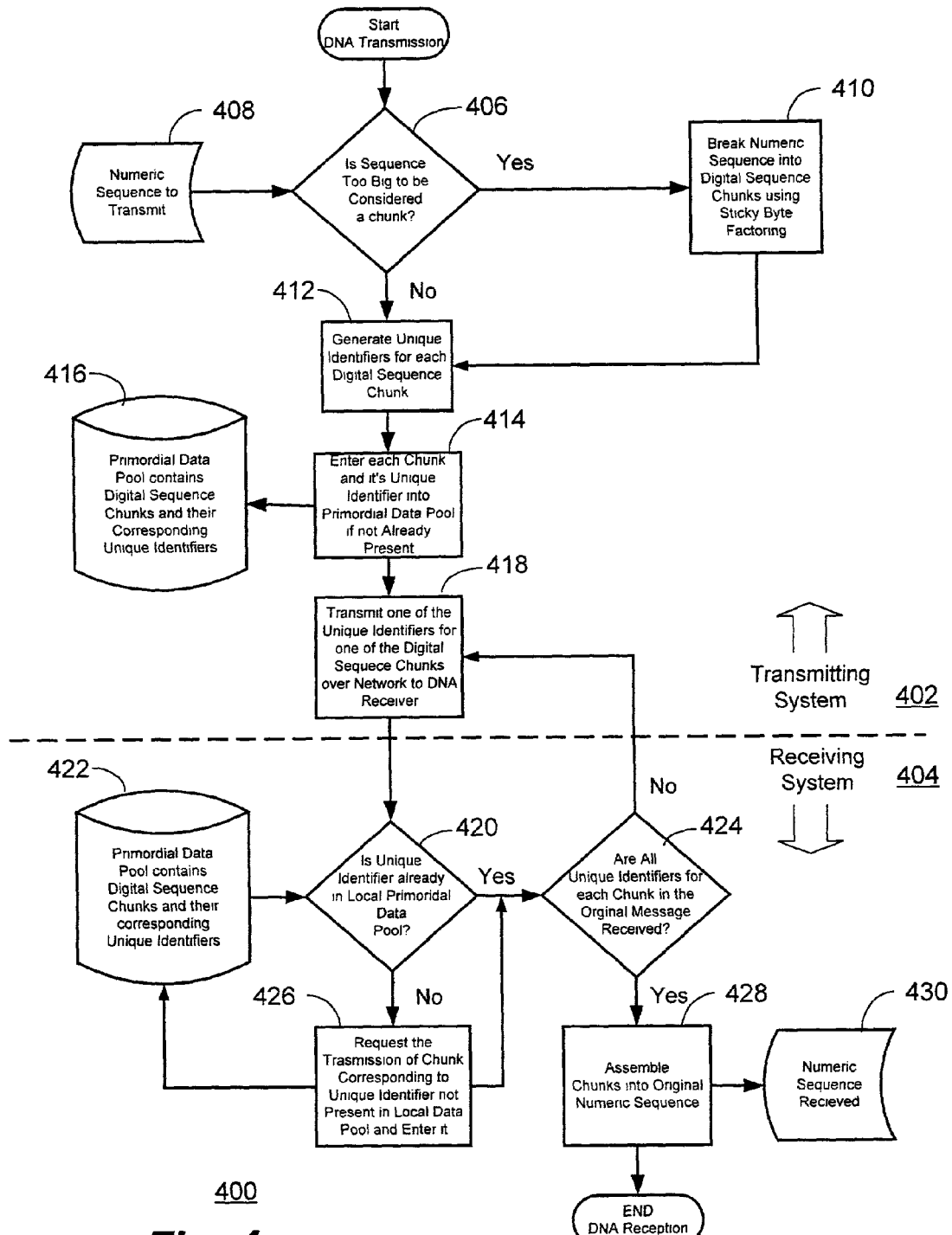
FIG. 4. is an exemplary logic flowchart for a possible utilization of system DNA transmission in a representative networking environment in which locally maintained primordial data pools are maintained in a state of synchronization as previously illustrated and described with respect to FIGS. 3A through 3L inclusive.

With reference additionally now to FIG. 4, an exemplary logic flowchart for a possible implementation of system DNA transmission 400 in a representative networking environment is shown in which locally maintained primordial data pools (including the tables 306 of Point A 302 and Point B 304 of the preceding FIGS. 3A through 3L inclusive) are maintained in a state of synchronization (or partial synchronization) as previously illustrated and described with respect to the preceding figures.

In this illustration, the DNA transmission 400 operation takes place between a transmitting system 402 (the function of which is indicated by the steps above the dashed lines and which corresponds generally to Point A 302 of FIGS. 3A through 3L inclusive) and a receiving system 404 (the function of which is indicated by the steps below the dashed lines and which corresponds generally to Point B 304 of FIGS. 3A through 3L inclusive).

The operation commences at decision step 406 wherein the transmitting systems 402 makes a determination as to whether the numeric sequence to be transmitted 408 (e.g. a data file, video stream etc.) is too big to be considered a single chunk. If it is, then at step 410, the numeric sequence is broken into digital sequence chunks using sticky byte factoring as disclosed and claimed in the aforementioned pending patent applications. Thereafter, at step 412, unique identifiers are generated for each of the digital sequence chunks using, for example, industry standard hashing algorithms. If, at decision step 406, the numeric sequence 408 to be transmitted is not too large to be considered a single chunk, a unique identifier for that chunk is generated at step 412.

At step 414, each chunk and its unique identifier generated at step 412 is entered into the local primordial data pool 416 (e.g. a lexicon), if not already present. The primordial data pool contains digital sequence chunks and their corresponding unique identifiers, the presence of which is determined in accordance with the tables 306 and their respective portions 310 and 308 as described with respect to the preceding FIGS. 3A through 3L inclusive. At step 418, one of the unique identifiers for one of the chunks of the numeric sequence 408 is transmitted from the transmitting system 402 to the receiving system 404 over the network.

The receiving system 404 then determines at decision step 420 whether or not the unique identifier received from the transmitting system is already maintained in the local primordial data pool 422. Again, this determination is made with respect to the entries in the table 306 associated with the primordial data pool 422 as previously described. If the unique identifier received is currently maintained in the primordial data pool 422 then, at decision step 424, the receiving system 404 determines whether or not all of the unique identifiers for each chunk in the message received from the transmitting system have now been received. If not, then the receiving system 404 requests the transmitting system 402 to send the remaining unique identifiers for the remaining chunks of the numeric sequence 408. At step 428, the received chunks are then assembled by the receiving system into the original numeric sequence and the numeric sequence received 430 by the receiving system 404 will correspond exactly with the numeric sequence 408 which was to be transmitted by the transmitting system 402.

At decision step 420, if the unique identifier is not already maintained in the local primordial data pool 422, the receiving system 404 requests the transmission of the chunk corresponding to the unique identifier and enters both into the primordial data pool 422 along with appropriate entries in the corresponding table 306 (FIGS. 3A through 3L inclusive). Overall, the DNA transmission 400 operation depicted in this figure illustrates a stepwise method for implementing the system and method of the present invention corresponding to the packet transmission operation illustrated in the preceding FIGS. 3A through 3L inclusive.

It should be noted that although the method described here serially transmits data for each unique identifier not present in the receiving systems primordial data pool, the same method applies to transmission in parallel. For example nearly all of the steps in FIG. 4 can be carried out in parallel, either by processing a number of digital or numeric sequences at once or by sending a number of unique identifiers at once and awaiting any negative acknowledgements. Given latencies generally observed in most communication systems, the execution of these steps in parallel is useful for making more efficient use of a communications link.

Figure 5:
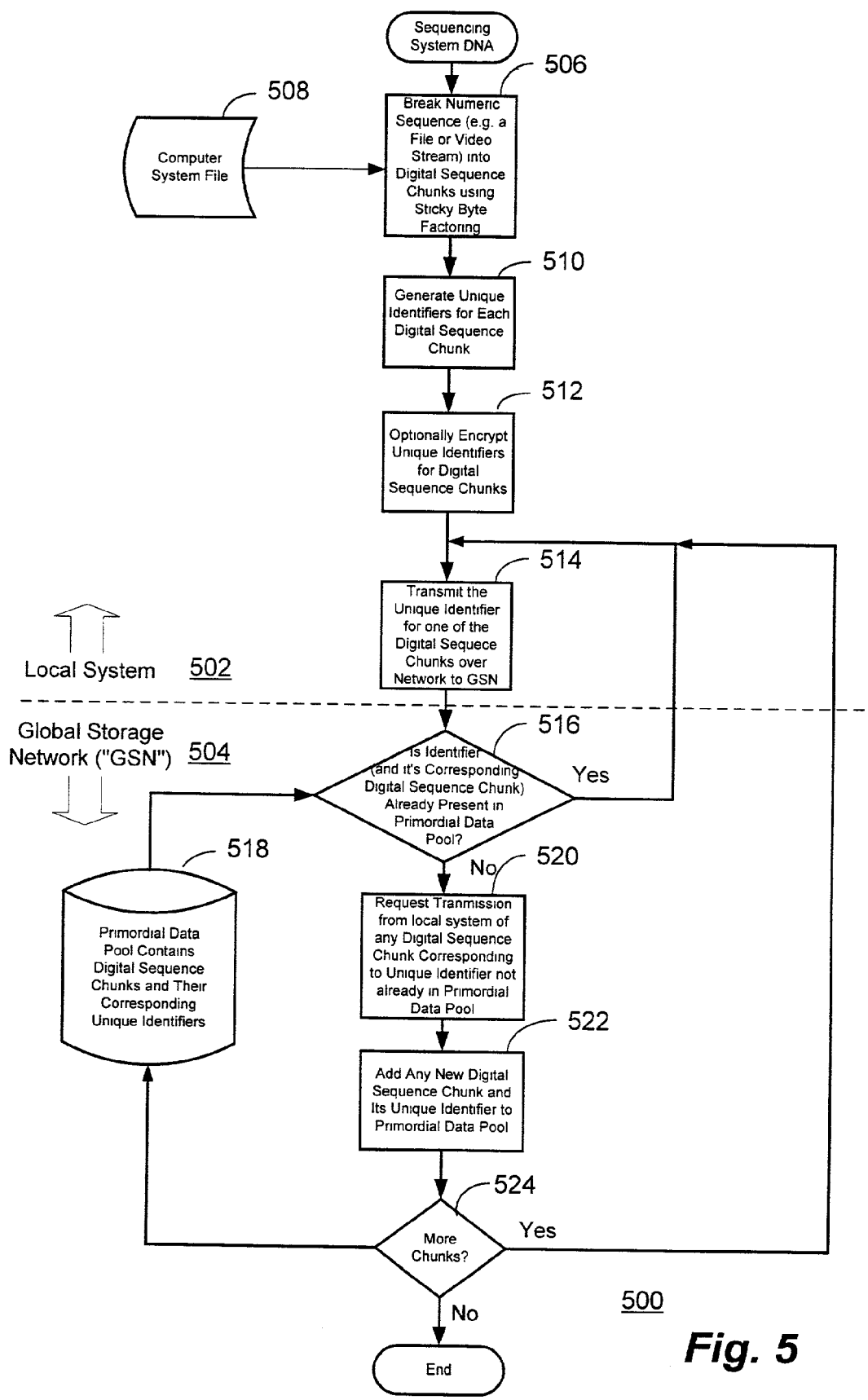
FIG. 5 is an exemplary logic flowchart for a representative implementation of a system DNA sequencing operation in accordance with the system and method of the present invention disclosed herein.

With reference additionally now to FIG. 5, an exemplary logic flowchart for a representative implementation of a system DNA sequencing operation 500 in accordance with the system and method of the present invention is shown. The DNA sequencing operation 500 is illustrated with respect to a local system 502 (the operations of which are indicated above the dashed line indicated) and a global storage network ("GSN" or global storage area network "gSAN") 504 (the operations of which are indicated below the dashed line indicated).

The DNA sequencing operation 500 is initiated by the local system 502 at step 506 wherein a numeric (or digital) sequence such as a computer system file 508 is broken into chunks using sticky byte factoring. It should be noted that the numeric sequence can be any digital sequence including a file, video stream or other data. At step 510, a unique identifier (e.g. a hashsum) is generated for each digital sequence chunk of the numeric sequence. Thereafter, if desired, the unique identifiers may be encrypted prior to transmission at step 512. In any event, the first of the unique identifiers generated at step 510 are transmitted to the global storage network 504 at step 514.

At decision step 516, the global storage network 504 determines if the unique identifier received (and hence, its corresponding digital sequence chunk) is already present in the global storage area network 504 primordial data pool 518 which contains previously received digital sequence chunks and their corresponding unique identifiers indexed by means of a table containing these entries. If the unique identifier received by the global storage network 504 is currently in the primordial data pool 518, the next unique identifier for the digital sequence chunks is transmitted by the local system 502. Alternatively, if the unique identifier received is not currently in the primordial data pool 518, the global storage network 504 then requests the local system 502 to instead transmit the digital sequence chunk corresponding to the unique identifier not found in the primordial data pool 518 at step 520. Any new digital chuck and its corresponding unique identifier then received from the local system 502 at the global storage network 504 are then added to the primordial data pool. This process is monitored at decision step 524 until all of the chunks to be transmitted by the local system 502 are then added to the primordial data pool 518 of the global storage network 504.

Figure 6:
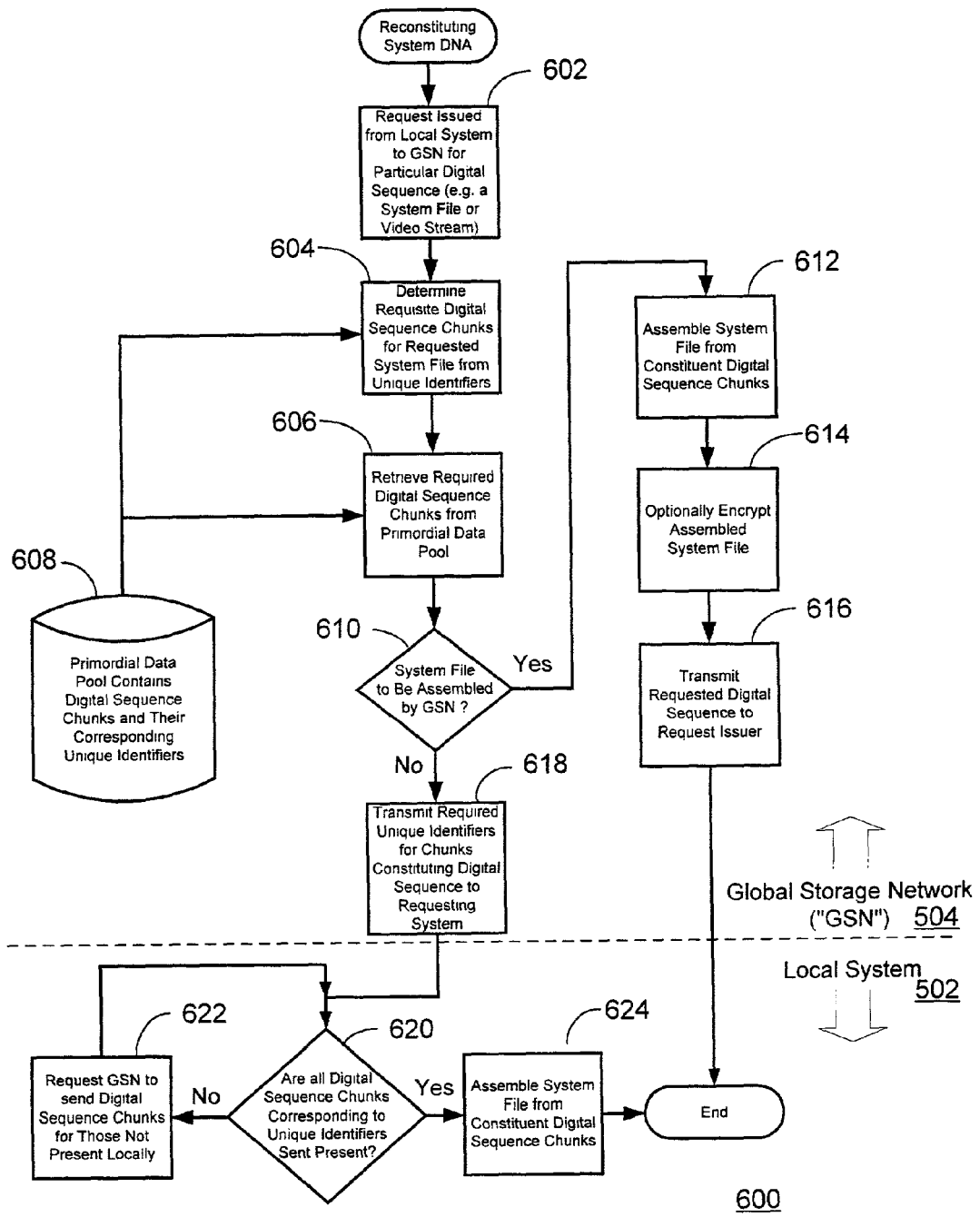
FIG. 6 is an exemplary logic flowchart for a representative implementation of a system DNA reconstitution operation in accordance with the system and method of the present invention disclosed herein.

With reference additionally now to FIG. 6, an exemplary logic flowchart for a representative implementation of a system DNA reconstitution operation 600 in accordance with the system and method of the present invention is shown. The system DNA reconstitution operation 600 is herein illustrated with respect to the local system 502 and global storage network 504 of the preceding figure.

The system DNA reconstitution operation 600 commences at step 602 when a request is issued by the local system 502 to the global storage network 504 for a particular digital sequence (e.g. a file, video stream etc.). At step 604, the global storage network 504 determines the requisite digital sequence chunks required for the requested digital sequence (or file, video stream etc.) from the unique identifiers for the digital sequence chunks comprising the requested digital sequence. This information as well as the required digital sequence chunks is maintained in the global storage network 504 primordial data pool 608 and the latter is retrieved from the primordial data pool 608 at step 606.

If the requested file (or digital sequence) is to be assembled prior to transmission to the local system 502 by the global storage network 504, then the system DNA reconstitution operation 600 proceeds to step 612 where the system file is assembled from its constituent digital sequence chunks. At step 614, the assembled system file may be encrypted if desired prior to its transmission to the request issuing local system 502 at step 616. Alternatively, the global storage network 504 can transmit the required unique identifiers for the chunks constituting the requested digital sequence to the requesting system which, in this case, is the local system 502 as shown in step 618.

The local system 502 receives the unique identifiers from the global storage network 504 and determines whether all of the digital sequence chunks corresponding to the unique identifiers received are presently available locally to the local system 502 at decision step 620. If one or more of the digital sequence chunks corresponding to the unique identifiers received are not available locally, a request is sent at step 622 to the global storage network 504 to transmit those digital sequence chunks to the local system 502. Once all of the digital sequence chunks are received by the local system 502, the originally requested digital sequence (e.g. system file, video stream etc.) is assembled at step 624.

Figure 7:
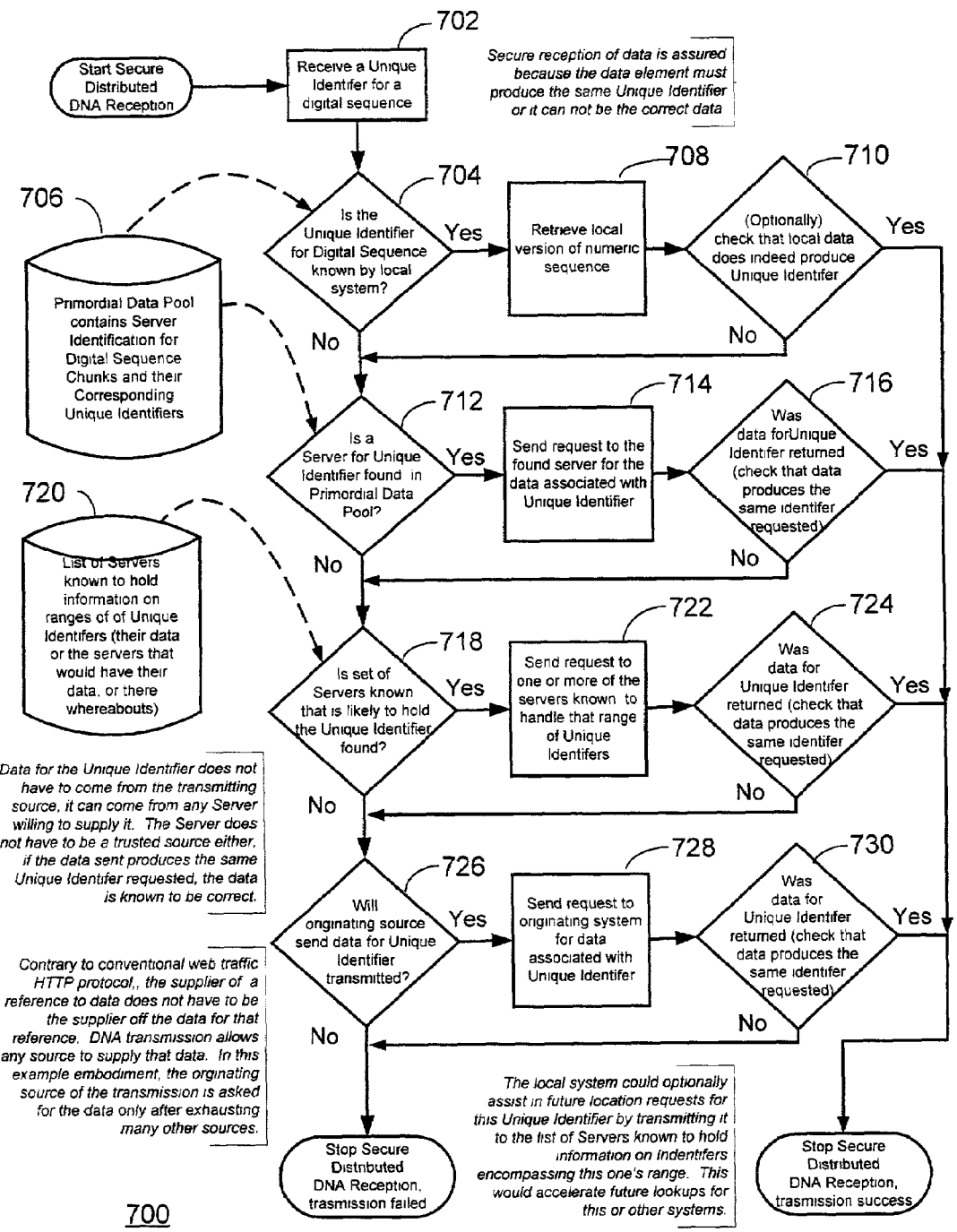
FIG. 7 is an exemplary logic flowchart for a representative secure distributed system DNA reception operation.

With reference additionally now to FIG. 7, an exemplary logic flowchart for a representative secure distributed system DNA reception operation 700 is shown. The operation 700 commences at step 702 with the receipt of a unique identifier for a digital sequence. At decision step 704, the local primordial data pool 706 is consulted to determine if the unique identifier for the digital sequence is already known to the local system. The primordial data pool 706 comprises server identification for digital sequence chunks and their corresponding unique identifiers. If, at decision step 704, the digital sequence is already known to the local system, then the local version of the numeric sequence corresponding to the unique identifier is retrieved from the primordial data pool 706 at step 708. Optionally, at decision step 710, a check can be performed to determine that the local data would independently produce the same unique identifier. If the check produces the same result, the operation 700 concludes with a successful system DNA reception transmission. Otherwise, the operation 700 returns to decision step 712, as in the case of a negative result at decision step 704.

At decision step 712, the local primordial data pool 706 is queried to determine if a server somewhere else is known to supply the unique identifier is indicated. If so, then at step 714, a request is sent to the indicated server for the data associated with the unique identifier. At decision step 716, if data for the unique identifier is returned from the server, a check can be performed to confirm that the data produced produces the same unique identifier. If it does, then the operation 700 concludes with a successful system DNA reception transmission. Otherwise, the operation 700 returns to decision step 718, as in the case of a negative result at decision step 712.

It should be noted that, with respect to decision steps 710 and 716, the secure reception of data is assured by these operations because the data element must produce the same unique identifier or it cannot be the same data element. Also, the local system may optionally assist in future location requests for this particular unique identifier by transmitting it to the list of servers 720 known to hold information on identifiers encompassing this one's range. This, then, would serve to accelerate future lookups at the local system or for other systems.

At decision step 718, a list of servers 720 is consulted to determine if a set of servers is known that is likely to hold the unique identifier received in step 702. The list of servers 720 comprises a list of servers known to hold information on ranges of unique identifiers (their data or the servers that would have their data or there whereabouts). If so, then at step 722, a request is sent to one or more of the servers known to handle the range of unique identifiers comprising the unique identifier received. If data for the particular unique identifier is returned at decision step 724, the operation 700 concludes with a successful system DNA reception transmission. Otherwise, the operation 700 returns to decision step 726, as in the case of a negative result at decision step 718.

With respect to decision step 718, the data for the unique identifier does not have to come from the transmitting source itself. Rather, it can come from any server willing to supply it. Moreover, the server does not have to be a trusted source inasmuch as, if the data sent produces the same unique identifier requested, the data is then, ipso facto, known to be correct (and with a high degree of certainty dependent on the hash algorithm or method of producing unique identifiers).

At decision step 726, if the originating source is able to send the data corresponding to the unique identifier, then at step 728, a request is sent to the originating system for the data associated with the unique identifier. If, at decision step 730, the data corresponding to the unique identifier is returned, then the operation 700 concludes with a successful system DNA reception transmission. Otherwise, the operation 700 concludes with an unsuccessful system DNA reception transmission, as in the case of a negative result at decision step 712.

Note that this series of steps is only meant to be illustrative of an exemplary implementation of distributed DNA reception. Other means for finding data for unique identifiers can be performed in the spirit of the steps depicted in FIG. 7. It is also possible that the order of such steps could be rearranged for better performance for different communications environments.

It should be noted that, contrary to conventional web traffic hypertext transfer protocol ("HTTP"), the supplier of the reference to the data does not have to be the supplier of the data for that reference. The DNA transmission system and method of the present invention allows any source to supply that data. In the exemplary operation 700 illustrated, the originating source of the transmission is asked for the data only after exhausting other sources. This is counter to normal HTTP transfer protocol methods that request all data from the same target source.

Disclosed herein, therefore, is a dynamic system DNA transmission and transcription technique wherein a digital sequence or data stream is selected for transmission from a first location to a second location. The digital sequence is parsed utilizing a factoring engine, such as those disclosed in the aforementioned patent applications, to consistently break the digital sequence (or data) into subsequences (or chunks) and associate unique identifiers with each subsequence. In operation, a secure communications link to the second location is initiated by the first location and the first location checks its local lexicon to determine if the second location has previously been demonstrated to have seen any of the unique identifiers associated with each subsequence in a prior communication. If the lexicon at the first location is aware that the lexicon at the second location contains one or more of the identifier-data pairs, the lexicon at the first location only sends the unique identifier associated with each data subsequence in question. The first location then inquires of the lexicon at the second location to determine if it contains any of the other unique identifiers associated with each identified subsequence of the digital sequence to be transmitted.

If the lexicon at the second location contains one or more of the unique identifiers in question, the data associated with those unique identifiers in the lexicon are simply inserted in the appropriate places in the digital sequence. On the other hand, if the lexicon at the second location does not contain one or more of the unique identifiers in question, the data associated with each identifier is sent from the first location in full for insertion at the appropriate place in the sequence and the new identifier-data pair is then entered into the lexicon at the second location for future reference. The lexicon at the first location is annotated to reflect which unique identifiers the lexicon at the second location has either been shown to have or updated to reflect knowledge as a result of this particular data transmission. The lexicon at the second location is also annotated to reflect which unique identifiers the lexicon at the first location has been shown to have as well.

Through the use of the system and method of the present invention disclosed above, a dramatic reduction in the volume of otherwise necessary data transmission between computers or computer systems may be effectuated over networks or other data transmission media. The present invention also advantageously improves the security of communications by sending unique identifiers (e.g. hashes or hashsums) as an alternative to the data itself. Consequently, this renders eavesdropping a significantly more difficult proposition due to the fact that, if the eavesdropper lacks the identifier to data correspondence table, decoding the message is computationally infeasible.

The system and method of the present invention solves the problem of how to effectively transmit data between locations without having to transmit the entire body of the data itself. This is readily distinguishable from data compression techniques which are able to, at best, merely compress a complete data image, often with concomitant losses. System DNA transmission is operative, instead, to replace the bulk of the intended transmission with unique symbols corresponding to one or more subsequences of the requested data.

The applications of the techniques disclosed herein are wide-ranging and any device that is required to transmit data to another point can benefit from a reduction in the volume of data that need ultimately be transferred. Since most applications reference units of information much larger than what is required for their immediate operations (e.g. a word processing program document might need to be opened to correct a single spelling error and the majority of the document would not need to be examined) the system and method of the present invention can transmit only the affected subsequence of the digital sequence representing the entire document.

While there have been described above the principles of the present invention in conjunction with specific operations and system configurations, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

What is claimed is:

1. A system for data transmission without loss of data integrity comprising:
a transmitting system comprising a first lexicon including a plurality of digital sequences with unique corresponding identifiers, wherein each of the digital sequences is greater in size than the corresponding unique identifiers and wherein said unique corresponding identifiers are based upon hashes of said corresponding digital sequences;
a receiving system;
a transmission medium coupling said transmitting and receiving systems, said transmitting system capable of transmitting at least one of said plurality of unique corresponding identifiers to said receiving system in lieu of said at least one corresponding digital sequence.

2. The system of claim 1 comprising:
another system capable of receiving at least one of said plurality of unique corresponding identifiers from one of said transmitting or receiving systems.

3. The system of claim 1 wherein said receiving system comprises a second lexicon including a plurality of digital sequences with unique corresponding identifiers.

4. The system of claim 2 wherein said another system comprises another lexicon including a plurality of digital sequences with unique corresponding identifiers.

5. The system of claim 4 wherein said first and second lexicons comprise information regarding content of other lexicons in said system.

6. The system of claim 1 wherein said unique corresponding identifiers are based upon sequential identifiers for said corresponding digital sequences.

7. The system of claim 1 wherein said unique corresponding identifiers are based upon a hash based file system.

8. The system of claim 1 wherein a digital sequence to be transmitted from said transmitting system to said receiving system is factored into a number of digital sequence chunks for which corresponding unique identifiers are ascribed.

9. The system of claim 8 wherein said digital sequence to be transmitted is factored by means of sticky byte factoring.

10. The system of claim 1 wherein said first lexicon further comprises information regarding contents of other lexicons in said system.

11. The system of claim 1 wherein data transmissions within said system are effectuated on a point-to-point basis.

12. The system of claim 1 wherein data transmissions within said system are effectuated on a point-to-multipoint basis.

13. The system of claim 1 wherein data transmissions are routed in said system based on metrics derived from said first lexicon.

14. A method for data transmission without loss of data integrity comprising:
providing a transmitting system comprising a first lexicon including a plurality of digital sequences with unique corresponding identifiers;
providing a receiving system;
coupling said transmitting and receiving systems through a transmission medium, said transmitting system capable of transmitting at least one of said plurality of unique identifiers to said receiving system in lieu of said at least one corresponding digital sequence; and
factoring a digital sequence to be transmitted from said transmitting system to said receiving system into a number of digital sequence chunks and ascribing corresponding unique identifiers therefor.

15. The method of claim 14 comprising:
providing another system capable of receiving at least one of said plurality of unique identifiers from one of said transmitting or receiving systems.

16. The method of claim 15 wherein said another system comprises another lexicon including a plurality of digital sequences with unique corresponding identifiers.

17. The method of claim 14 wherein said receiving system comprises a second lexicon including a plurality of digital sequences with unique corresponding identifiers.

18. The method of claim 17 wherein said first and second lexicons comprise information regarding content of other lexicons in said system.

19. The method of claim 14 wherein said unique identifiers are based upon hashes of said corresponding digital sequences.

20. The method of claim 14 wherein said unique identifiers are based upon sequential identifiers for said corresponding digital sequences.

21. The method of claim 14 wherein said unique identifiers are based upon a hash based file system.

22. The method of claim 14 wherein said step of factoring is carried out by means of sticky byte factoring.

23. The method of claim 14 wherein said first lexicon further comprises information regarding contents of other lexicons in said system.

24. The method of claim 14 wherein data transmissions within said system are effectuated on a point-to-point basis.

25. The method of claim 14 wherein data transmissions within said system are effectuated on a point-to-multipoint basis.

26. The system of claim 14 further comprising:
routing data transmissions in said system based on metrics derived from said first lexicon.

27. A system for symbolic exchange of digital sequences without loss of data integrity comprising:
first and second computer systems comprising respective first and second local lexicons including a plurality of digital sequences with unique corresponding identifiers; and
a transmission medium coupling said first and second computer systems;
said first computer system operative to transmit a first unique identifier to said second computer system in lieu of said corresponding digital sequence;
wherein said second computer system is operative to compare said first unique identifier to contents of said second local lexicon and request said first computer system to transmit said corresponding digital sequence to said first unique identifier if said first unique identifier is not present in said second lexicon; and wherein said second computer system is operative to add said corresponding digital sequence to said first unique identifier to said second local lexicon if not previously contained therein.

28. The computer system of claim 27 wherein said second computer system is operative to add said corresponding digital sequence to said first unique identifier to said second local lexicon if not previously contained therein.

29. The computer system of claim 27 further comprising:
a third computer system comprising a third local lexicon including a plurality of digital sequences with unique corresponding identifiers, said third computer system coupled to one of said first or second computer systems and operative to receive a first unique identifier therefrom in lieu of said corresponding digital sequence.

30. The computer system of claim 27 wherein said transmission medium comprises a network.

31. The computer system of claim 30 wherein said network comprises the Internet.

32. The computer system of claim 27 wherein said unique identifiers are based upon a hash of said corresponding digital sequence.

33. The computer system of claim 27 wherein said digital sequence comprises a file.

34. The computer system of claim 27 wherein said digital sequence comprises a video stream.

35. A method for symbolic exchange of digital sequences without loss of data integrity between first and second computer systems including respective first and second local tables in memory containing a plurality of digital sequences with unique corresponding identifiers, said method comprising:
transmitting a first unique identifier from said first computer system to said second computer system in lieu of said corresponding digital sequence;
comparing said first unique identifier to said contents of said second local table; and
requesting said first computer system to transmit said corresponding digital sequence to said first unique identifier if said first unique identifier is not present in said second local table;
wherein said unique identifiers are based upon a hash of said corresponding digital sequence.

36. The method of claim 35 further comprising:
transmitting said corresponding digital sequence to said first unique identifier if said first computer system is aware that said second local table does not contain said unique identifier.

37. The method of claim 35 further comprising the step of:
adding said corresponding digital sequence to said first unique identifier to said second local table in not previously present therein.

38. The method of claim 35 further comprising the step of:
providing a third computer system comprising a third local table including a plurality of digital sequences with unique corresponding identifiers;
coupling said third computer system to one of said first or second computer systems; and
receiving a first unique identifier from said one of said first or second computer systems in lieu of said corresponding digital sequence.

39. The method of claim 35 wherein said digital sequence comprises a file.

40. The method of claim 35 wherein said digital sequence comprises a video stream.

41. The method of claim 35 further comprising with said first unique identifier generating a new digital sequence at the second computer system that comprises said corresponding digital sequence retrieved from said second local table.

42. The method of claim 41 wherein the generating of the new digital sequence comprises retrieving the corresponding digital sequence from the second local table by indexing with the first unique identifier and wherein the new digital sequence comprises additional ones of the plurality of digital sequences retrieved from second local table based on a set of the unique corresponding identifiers received from the first computer system.

43. A system for symbolic exchange of digital sequences without loss of data integrity comprising:
first and second computer systems comprising respective first and second local lexicons including a plurality of digital sequences with unique corresponding identifiers; and
a transmission medium coupling said first and second computer systems, wherein said transmission medium comprises a network;
said first computer system operative to transmit a first unique identifier to said second computer system in lieu of said corresponding digital sequence;
wherein said second computer system is operative to compare said first unique identifier to contents of said second local lexicon and request said first computer system to transmit said corresponding digital sequence to said first unique identifier if said first unique identifier is not present in said second lexicon.

44. The system of claim 43, wherein said unique identifiers are based upon a hash of said corresponding digital sequence.

45. The computer system of claim 44, wherein said digital sequence comprises a file.

46. The computer system of claim 44, wherein said digital sequence comprises a video stream.

47. A system for symbolic exchange of digital sequences without loss of data integrity comprising:
first and second computer systems comprising respective first and second local lexicons including a plurality of digital sequences with unique corresponding identifiers, wherein said digital sequences each comprise a file; and
a transmission medium coupling said first and second computer systems;
said first computer system operative to transmit a first unique identifier to said second computer system in lieu of said corresponding digital sequence;
wherein said second computer system is operative to compare said first unique identifier to contents of said second local lexicon and request said first computer system to transmit said corresponding digital sequence to said first unique identifier if said first unique identifier is not present in said second lexicon.

48. A system for symbolic exchange of digital sequences without loss of data integrity comprising:
first and second computer systems comprising respective first and second local lexicons including a plurality of digital sequences with unique corresponding identifiers, wherein said digital sequences each comprise a video stream; and
a transmission medium coupling said first and second computer systems;
said first computer system operative to transmit a first unique identifier to said second computer system in lieu of said corresponding digital sequence;
wherein said second computer system is operative to compare said first unique identifier to contents of said second local lexicon and request said first computer system to transmit said corresponding digital sequence to said first unique identifier if said first unique identifier is not present in said second lexicon.

49. A method for symbolic exchange of digital sequences without loss of data integrity between first and second computer systems including respective first and second local tables in memory containing a plurality of digital sequences with unique corresponding identifiers, said method comprising:

transmitting a first unique identifier from said first computer system to said second computer system in lieu of said corresponding digital sequence;

comparing said first unique identifier to said contents of said second local table;

requesting said first computer system to transmit said corresponding digital sequence to said first unique identifier if said first unique identifier is not present in said second local table; and transmitting said corresponding digital sequence to said first unique identifier if said first computer system is aware that said second local table does not contain said unique identifier.

* * * * *